US012576431B2

(12) United States Patent
Terada et al.

(10) Patent No.: US 12,576,431 B2
(45) **Date of Patent: *Mar. 17, 2026**

(54) METHOD FOR FORMING MULTI-LAYER COATING FILM

(71) Applicant: KANSAI PAINT CO., LTD., Hyogo (JP)

(72) Inventors: Kaisei Terada, Aichi (JP); Hiroshi Murata, Aichi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 480 days.

This patent is subject to a terminal disclaimer.

(21) Appl. No.: 18/018,054

(22) PCT Filed: Jul. 27, 2021

(86) PCT No.: PCT/JP2021/027777

§ 371 (c)(1),
(2) Date: Jan. 26, 2023

(87) PCT Pub. No.: WO2022/025070

PCT Pub. Date: Feb. 3, 2022

(65) Prior Publication Data

US 2023/0302493 A1 Sep. 28, 2023

(30) Foreign Application Priority Data

Jul. 29, 2020 (JP) ................................ 2020-128623

(51) Int. Cl.
*B05D 7/00* (2006.01)
*B05D 5/06* (2006.01)
*C25D 13/00* (2006.01)

(52) U.S. Cl.
CPC .............. *B05D 7/572* (2013.01); *B05D 5/06* (2013.01); *C25D 13/00* (2013.01)

(58) Field of Classification Search
None
See application file for complete search history.

(56) References Cited

U.S. PATENT DOCUMENTS

| | | | | |
|---|---|---|---|---|
| 11,369,991 | B2 * | 6/2022 | Omura | B05D 5/06 |
| 2009/0246545 | A1 * | 10/2009 | Nomi | B05D 7/572 428/480 |
| 2010/0189906 | A1 * | 7/2010 | Kume | B05D 7/572 427/372.2 |
| 2019/0344309 | A1 | 11/2019 | Ono et al. | |
| 2021/0121914 | A1 | 4/2021 | Omura | |

FOREIGN PATENT DOCUMENTS

| | | | | |
|---|---|---|---|---|
| JP | 2004351389 | A | 12/2004 | |
| JP | 2004351390 | A | 12/2004 | |
| WO | WO-2006009219 | A1 | 1/2006 | |
| WO | WO-2009/014226 | A2 | 1/2009 | |
| WO | WO-2012002569 | A1 * | 1/2012 | B05D 7/572 |
| WO | WO-2019/225559 | A1 | 11/2019 | |

* cited by examiner

*Primary Examiner* — Luan V Van
(74) *Attorney, Agent, or Firm* — MARSHALL, GERSTEIN & BORUN LLP

(57) ABSTRACT

Provided is a method for forming a multi-layer coating film which makes it possible to form a multi-layer coating film which exhibits excellent smoothness and luster. The present invention forms, on a cured electrodeposited coating film formed on a stell plate, a first colored coating film comprising a first coloring coating material (P1), a second coating film comprising a second aqueous coating material (P2) having specific viscometric properties, a third colored coating film comprising a third aqueous color coating material (P3) which has a specific coating material solid content concentration (NVP3) and contains a lustrous pigment (BP3), and a clearcoat film comprising a clearcoat material (P4). The present invention simultaneously cures the formed multi-layer coating film by heating.

6 Claims, No Drawings

METHOD FOR FORMING MULTI-LAYER COATING FILM

TECHNICAL FIELD

The present invention relates to a method of forming a multi-layer coating film, the method enabling the formation of a multi-layer coating film with excellent brightness.

BACKGROUND ART

As a method of forming a coating film on an automobile body, a method of forming a multi-layer coating film through a three-coating two-baking (3C2B) scheme is widely used, which includes applying an electrodeposition paint onto an object to be coated, then applying an intermediate coating paint thereon, baking and curing, applying a base paint, preheating, and then applying a clear coating paint thereon and baking and curing. However, in recent years, from the perspective of energy conservation, the process of baking and curing after application of the intermediate coating paint is omitted, and a three-coating one-baking (3C1B) scheme is being attempted in which the electrodeposition paint is applied onto the object to be coated, after which an intermediate coating paint is applied thereon, preheating is implemented, a base paint is then applied, preheating is again implemented, and then a clear coat paint is applied, and baking and curing are implemented.

Furthermore, multi-layer coating films of light interference paint colors such as metallic paint colors, mica paint colors, and pearl paint colors are typically formed using, as top coating paints, a base paint that includes a bright pigment for providing a high level of brightness, and a transparent clear paint. Note that a coating film having high brightness generally has a significant change in lightness due to the angle of observation when the coating film is observed as the angle is changed, and further is a coating film in which the bright pigment is present relatively homogeneously in the coating film, and almost no metallic unevenness is observed. Furthermore, as described above, when the change in lightness due to the angle of observation is significant, the flip-flop property is generally high.

As bright pigments, ordinarily aluminum flake pigments with metallic luster are used in the case of metallic paint colors, and light interference pigments such as mica pigments coated with a metal oxide and aluminum oxide pigments coated with a metal oxide are used in the case of light interference paint colors. Ordinarily, multi-layer coating films of these paint colors are formed by sequentially applying a bright pigment-containing base paint and a clear paint in a wet-on-wet manner onto an intermediate coating film that has been baked, and subsequently curing the obtained uncured coating film in a single baking process.

However, when a multi-layer coating film of a metallic paint color or a light interference paint color is formed by wet-on-wet coating, the orientation of the bright pigment contained in the base paint becomes disordered, resulting in a problem of a decrease in brightness.

Also, in recent years, the use of water-based paints has been increasing from the viewpoint of reducing environmental burden. However, with water-based paints, the volatilization rate of water, which is the diluting solvent, is slow, and the volatilization rate is greatly impacted by the application environment conditions such as temperature and humidity. Therefore, in the case of wet-on-wet coating with a water-based paint, the orientation of the bright pigment is more easily disordered compared to a case in which an organic solvent-based paint is used, and as a result, the decrease in brightness becomes more pronounced.

Various methods have been proposed in the past to solve the above problems.

For example, JP 2004-351389 A and JP 2004-351390 A disclose methods for forming an bright coating film, the methods including applying a water-based first base bright paint onto an intermediate coating film to form an uncured first base coating film, applying a water-based second base bright paint onto the uncured first base coating film to form an uncured second base coating film, applying a clear paint onto the uncured second base coating film to form a clear coating film, and heating and curing the uncured first base coating film, second base coating film, and clear coating film all at once. These documents also describes that, in the methods described above, the paint solid content in the water-based first base bright paint and the water-based second base bright paint and the concentration of the bright pigment are adjusted, and thereby a metallic appearance free of brightness unevenness is exhibited with, for example, an aluminum flake pigment having metallic luster, and furthermore, an bright coating film that manifests an extremely high flip-flop property can be obtained with, for example, a mica pigment having interference properties.

SUMMARY OF INVENTION

Technical Problem

However, when the technique described in JP 2004-351389 A or JP 2004-351390 A is used in the application of the base paint in the three-coating one-baking (3C1B) scheme, a problem occurs in that the smoothness of the formed multi-layer coating film is impaired. The present invention was developed in view of the above-described circumstances in the related art, and an object of the present invention is to provide a method of forming a multi-layer coating film, the method adopting a scheme of simultaneously curing four layers including a first colored coating film, a second coating film, a third colored coating film, and a clear coating film, and enabling the formation of a multi-layer coating film with excellent smoothness and brightness.

Solution to Problem

According to the present invention, a multi-layer coating film formation method including the following aspects is provided.

[Aspect 1]

A method of forming a multi-layer coating film, the method including the following steps (1) to (6):

(1) applying an electrodeposition paint onto a steel sheet, heating and curing an applied electrodeposition paint to form a cured electrodeposited coating film;

(2) applying a first colored paint (P1) onto the cured electrodeposited coating film obtained in step (1) to form a first colored coating film;

(3) applying a second water-based paint (P2) onto the first colored coating film obtained in step (2) to form a second coating film having a cured film thickness (TP2) in a range of from 5 to 20 μm;

(4) applying a third water-based colored paint (P3) onto the second coating film obtained in step (3) to form a third colored coating film having a cured film thickness (TP3) in a range of from 0.5 to 7 μm, the third water-based colored paint (P3) including a binder component (AP3) and a bright pigment (BP3), and a paint solid content concentration (NVP3) being in a range of from 2 to 17 mass %;

(5) applying a clear coat paint (P4) onto the third colored coating film obtained in step (4) to form a clear coating film; and (6) heating a multi-layer coating film including the first colored coating film, the second coating film, the third colored coating film, and the clear coating film formed in steps (2) to (5) to simultaneously curing the multi-layer coating film, wherein a viscosity (V2P2) of the second water-based paint (P2) one minute after application is in a range of from 3 to 500 Pa·sec when measured under conditions including a shear rate of 0.1 sec-1 and a temperature of 23° C., and a ratio (V2P2)/(V1P2) of the viscosity (V2P2) one minute after application to a viscosity (V1P2) of the second water-based paint (P2) measured under conditions including a shear rate of 0.1 sec-1 and a temperature of 23° C. is in a range of from 1.1/1 to 5/1.

[Aspect 2]

The method of forming a multi-layer coating film according to aspect 1, wherein the first colored paint (P1) is a water-based paint.

[Aspect 3]

The method of forming a multi-layer coating film according to aspect 1 or 2, wherein a cured film thickness (TP1) of the first colored coating film is in a range of from 15 to 40 μm.

[Aspect 4]

The method of forming a multi-layer coating film according to any one of aspects 1 to 3, wherein the viscosity (V1P2) of the second water-based paint (P2) measured under conditions including a shear rate of 0.1 sec-1 and a temperature of 23° C. is in a range of from 20 to 300 Pa sec.

[Aspect 5]

The method of forming a multi-layer coating film according to any one of aspects 1 to 4, wherein a content proportion of the binder component (AP3) and the bright pigment (BP3) in the third water-based colored paint (P3) is such that based on 100 parts by mass of solid content of the binder component (AP3), a content of the bright pigment (BP3) is in a range of from 3 to 500 parts by mass.

[Aspect 6]

The method of forming a multi-layer coating film according to any one of aspects 1 to 5, wherein a content proportion of the bright pigment (BP3) in the third water-based colored paint (P3) is in a range of from 3 to 80 mass % based on a paint solid content in the third water-based colored paint (P3).

Advantageous Effects of Invention

According to the present invention, a method can be adopted in which four layers including a first colored coating film, a second coating film, a third colored coating film, and a clear coating film are simultaneously cured, and a multi-layer coating film with excellent smoothness and brightness can be formed even when a water-based paint is used.

DETAILED DESCRIPTION OF EMBODIMENTS

The present invention is described in detail below through embodiments, but these embodiments are merely examples of preferred embodiments, and the present invention is not limited by the content of these embodiments.

[Formation of Cured Electrodeposited Coating Film]

In the present invention, first, an electrodeposition paint is applied onto a steel sheet and cured by heating to form a cured electrodeposited coating film (step (1)). In the present specification, the electrodeposition paint is a paint that is applied onto the surface of a steel sheet, which is an object to be coated, and thereby prevents rusting and corrosion of the steel sheet, and is also used to strengthen impact resistance of the surface of an article on which the multi-layer coating film is formed.

Examples of the steel sheet used as the object to be coated include cold-rolled steel sheets, alloyed hot-dip galvanized steel sheets, electro-galvanized steel sheets, zinc-iron two-layer electro-plated steel sheets, organic composite plated steel sheets, Al materials, and Mg materials. As necessary, the surfaces of these metal sheets may be cleaned through alkaline degreasing or the like and then subjected to a surface treatment such as phosphate chemical treatment, a chromate treatment, or a composite oxide treatment.

The electrodeposition paint used in this step is preferably a thermosetting water-based paint that is commonly used in the relevant field, and a cationic electrodeposition paint or anionic electrodeposition paint can be used. The electrodeposition paint is preferably a water-based paint containing a base resin and a curing agent, and an aqueous medium including water and/or a hydrophilic organic solvent.

From the perspective of rust resistance, for example, an epoxy resin, an acrylic resin, a polyester resin, or the like is preferably used as the base resin. Of these, from the perspective of rust resistance, a resin having an aromatic ring is preferably used as at least one type of the base resin, and of such resins, an epoxy resin having an aromatic ring is preferably used. Also, for example, a blocked polyisocyanate compound, an amino resin, or the like is preferably used as the curing agent. Here, examples of the hydrophilic organic solvent include methanol, ethanol, n-propyl alcohol, isopropyl alcohol, and ethylene glycol. A coating film having high rust resistance can be obtained by applying the electrodeposition paint.

In this step, as the means for applying the electrodeposition paint onto the steel sheet, an electrodeposition coating method that is commonly used in the relevant field can be used. According to this coating method, a coating film having high rust resistance can be formed across substantially the entire surface of the object to be coated, even with an object that has been subjected to a forming process in advance.

In order for the electrodeposited coating film formed in this step to prevent the generation of a mixed layer with a first colored coating film formed on the same coating film and improve the coated appearance of the multi-layer coating film obtained as a result, the thermosetting electrodeposition paint is applied, and then the uncured coating film is baked and cured by heating. Note that in the present specification, a "cured electrodeposited coating film" means a coating film obtained by heating and curing the electrodeposited coating film formed on the steel sheet.

In general, when the baking treatment is implemented at a temperature above 190° C., the coating film becomes too hard and brittle, and conversely, when the baking treatment is implemented at a temperature lower than 110° C., the reaction of the above components is insufficient, neither of which is preferable. Therefore, in this step, the temperature of the baking treatment of the uncured electrodeposited coating film is generally in a range of from 110 to 190° C., and particularly preferably in a range of from 120 to 180° C. Furthermore, usually, the baking treatment time is preferably from 10 to 60 minutes. A cured electrodeposited coating film can be obtained in a dry state by implementing the baking treatment under the conditions described above.

Furthermore, the dry film thickness of the cured electrodeposited coating film after the baking treatment under the conditions described above is usually preferably in a range of from 5 to 40 μm and particularly preferably in a range of from 10 to 30 μm.

Rust resistance of the coated steel sheet can be improved by forming the electrodeposited coating film in the manner described above.

[Formation of First Colored Coating Film]

A first colored paint (P1) is applied onto the cured electrodeposited coating film obtained in step (1), and a first colored coating film is thereby formed (step (2)). The first colored paint (P1) is a paint containing a binder component and a color pigment. The first colored paint (P1) is used to form the first colored coating film, and thereby a multi-layer coating film having excellent smoothness and brightness can be formed together with a second coating film formed by a second water-based paint (P2) and a third colored coating film formed by a third water-based colored paint (P3).

As the binder component used in the first colored paint (P1), a coating film-forming resin composition commonly used in an intermediate coating paint can be used. Examples of such resin compositions include resin compositions in which a curing agent is used in combination with a base resin having a crosslinkable functional group such as a hydroxyl group. Examples of the base resin include an acrylic resin, a polyester resin, an alkyd resin, and a urethane resin. Examples of the curing agent include amino resins such as melamine resin and urea resin, or polyisocyanate compounds (including a blocked polyisocyanate compound). The proportions of the base resin and the curing agent in the resin composition are not particularly limited, but ordinarily, the curing agent is used at a proportion in a range of from 10 to 100 mass %, preferably from 20 to 80 mass %, and more preferably from 30 to 60 mass %, based on the total solid content of the base resin. The base resin and the curing agent can be used by dissolving or dispersing them in a solvent such as an organic solvent and/or water.

The color pigment used in the first colored paint (P1) is not particularly limited, and one type of a conventionally known color pigment can be used alone, or two or more types can be combined and used. Specific examples of the color pigments that can be used include composite metal oxide pigments, such as a titanium dioxide pigment, an iron oxide pigment, and titanium yellow, azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, azo metal chelate-based pigments, phthalocyanine-based pigments, indanthrone-based pigments, dioxane-based pigments, threne-based pigments, indigo-based pigments, and carbon black pigments. From the perspective of properties such as the weather resistance of the formed multi-layer coating film, a titanium dioxide pigment or a carbon black pigment is preferably used as at least one of the color pigments used in the first colored paint (P1).

The content of the color pigment in the first colored paint (P1) is preferably in a range of from 0.01 to 150 parts by mass, more preferably in a range of from 0.02 to 130 parts by mass, and particularly preferably in a range of from 0.03 to 110 parts by mass, based on 100 parts by mass of the total solid content of the binder component in the first colored paint (P1).

When the first colored paint (P1) contains the titanium dioxide pigment described above, the content of the titanium dioxide pigment is preferably in a range of from 5 to 150 parts by mass, more preferably in a range of from 6 to 130 parts by mass, and particularly preferably in a range of from 7 to 110 parts by mass, based on 100 parts by mass of the total solid content of the binder component in the first colored paint (P1).

When the first colored paint (P1) contains the carbon black pigment described above, the content of the carbon black pigment is preferably in a range of from 0.01 to 3 parts by mass, more preferably in a range of from 0.02 to 2.5 parts by mass, and particularly preferably in a range of from 0.03 to 2.0 parts by mass, based on 100 parts by mass of the total solid content of the binder component in the first colored paint (P1).

As necessary, a solvent such as water or an organic solvent, various additives such as a pigment dispersing agent, a curing catalyst, a defoaming agent, an antioxidant, a UV absorber, a light stabilizer, a thickener, and a surface conditioner, bright pigments such as an aluminum pigment, and extender pigments such as barium sulfate, barium carbonate, calcium carbonate, talc, and silica can be appropriately compounded in the first colored paint (P1).

The first colored paint (P1) may be a water-based paint or an organic solvent-based paint, but from the perspective of reducing VOCs, the first colored paint (P1) is preferably a water-based paint. Here, a water-based paint is a term that is used in contrast with an organic solvent-based paint, and ordinarily means a paint obtained by dispersing and/or dissolving a binder component, a pigment, and the like in water or a medium (aqueous medium) containing water as a main component. When the first colored paint (P1) is a water-based paint, the content of water in the first colored paint (P1) is preferably approximately 20 to 80 mass %, and more preferably approximately 30 to 60 mass %.

The first colored paint (P1) can be prepared by mixing and dispersing the aforementioned components. A paint solid content concentration (NVP1) of the first colored paint (P1) is preferably adjusted to a range of from 30 to 60 mass %, and more preferably a range of from 40 to 50 mass %.

The first colored paint (P1) can be adjusted to have an appropriate viscosity for application by adding water, an organic solvent, or the like, and then applied, as necessary, by a known method such as rotary atomization coating, air spraying, and airless spraying. From perspectives such as the smoothness and finish of the coating film, the first colored paint (P1) is applied such that on the basis of the cured film thickness (TP1), the film thickness is in a range of preferably from 15 to 40 μm, more preferably from 17 to 35 μm, and even more preferably from 20 to 30 μm.

The L* value (L*P1) of the lightness of the first colored paint (P1) in the L*a*b* color system when a cured coating film having a thickness of 30 μm is formed is not particularly limited, but is usually from 1 to 95. In this range, from the perspective of flip-flop properties of the multi-layer coating film that is formed, the L* value (L*P1) of the lightness of the first colored paint (P1) in the L*a*b* color system when a cured coating film having a thickness of 30 μm is formed is preferably from 1 to 75, more preferably from 2 to 70, and even more preferably from 3 to 65.

The L*a*b* color system is a color system that was standardized by the International Commission on Illumination (CIE) in 1976, and was adopted in Japan as well in JIS Z 8784-1. In the L*a*b* color system, the lightness is expressed as L*, and the chromaticity, which indicates hue and chroma, is expressed as a* and b*. A positive value of a* indicates a red direction (whereas a negative value of a* indicates a green direction), and a positive value of b* indicates a yellow direction (whereas a negative value of b* indicates a blue direction). In the present specification, L*, a* and b* are defined as numerical values calculated from the spectral reflectance of light received at 90 degrees in relation to the surface of the coating film when light irradiates the coating film at 45 degrees in relation to a vertical axis of the coating film, the spectral reflectance being obtained using the CM-512m3 multi-angle spectrophotometer (trade name, available from Konica Minolta, Inc.).

The first colored coating film is left uncured and supplied to the formation of a second coating film in the next step (3). In step (6) described below, the first colored coating film is heated and cured together with the second coating film, a third colored coating film and a clear coating film formed in steps (3) to (5). Also, if necessary, before forming the second coating film in the next step (3), the first colored coating film may be directly or indirectly heated through a method such as preheating or air blowing at a temperature of approximately 40 to approximately 110° C., preferably from approximately 50 to approximately 90° C., and even more preferably from approximately 60 to approximately 80° C. for around 30 seconds to 60 minutes and preferably around 1 to 10 minutes. Of these, from perspectives such as the smoothness and brightness of the multi-layer coating film that is formed, preheating is preferably implemented between step (2) and step (3). The preheating can ordinarily be implemented by directly or indirectly heating the object coated with the first colored paint (P1) in a drying furnace at a temperature of from 40 to 100° C., preferably from 50 to 90° C., and more preferably from 60 to 80° C. for 30 seconds to 20 minutes, preferably 1 to 15 minutes, and more preferably 2 to 10 minutes.

[Formation of Second Coating Film]

In step (3), a second water-based paint (P2) that is a water-based paint is applied onto the first colored coating film obtained in step (2), and a second coating film having a cured film thickness (TP2) in a range of from 5 to 20 μm is formed. Here, the second water-based paint (P2) is a water-based paint containing a binder component and has a specific viscosity property.

As the binder component used in the second water-based paint (P2), a resin composition containing a coating film-forming resin commonly used in paints can be used. As such a resin composition, a thermosetting resin composition can be suitably used, and specifically, for example, a thermosetting resin composition in which a base resin having a crosslinkable functional group such as a hydroxyl group is used in combination with a curing agent can be used. Examples of the base resin having a crosslinkable functional group include an acrylic resin, a polyester resin, an alkyd resin, and a urethane resin, and examples of the curing agent include a melamine resin, a urea resin, and a polyisocyanate compound (including a blocked polyisocyanate compound).

Of these, from the perspectives of brightness and smoothness of the multi-layer coating film that is formed, as at least one type, the base resin preferably includes at least one type of resin selected from a hydroxyl group-containing acrylic resin, a hydroxyl group-containing polyester resin, and a urethane resin, more preferably includes at least one type of resin selected from a hydroxyl group-containing acrylic resin and a hydroxyl group-containing polyester resin, and even more preferably includes a hydroxyl group-containing acrylic resin and a hydroxyl group-containing polyester resin.

Of these, from the perspective of brightness and smoothness of the multi-layer coating film that is formed, the base resin preferably contains a water-dispersible hydroxyl group-containing acrylic resin (A) as at least one type of the hydroxyl group-containing acrylic resin.

Water-Dispersible Hydroxyl Group-Containing Acrylic Resin (A)

The water-dispersible hydroxyl group-containing acrylic resin (A) can typically be produced by copolymerizing a hydroxyl group-containing polymerizable unsaturated monomer (a) and another polymerizable unsaturated monomer (b) that is copolymerizable with the hydroxyl group-containing polymerizable unsaturated monomer (a) by a method known per se, such as, for example, an emulsion polymerization method in an aqueous medium.

The hydroxyl group-containing polymerizable unsaturated monomer (a) is a compound having at least one hydroxyl group and at least one polymerizable unsaturated group per molecule, and examples include monoesterified products of a C2-8 dihydric alcohol and a (meth)acrylic acid, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of these monoesterified products; N-hydroxymethyl (meth)acrylamides; allyl alcohols; and (meth)acrylates having a polyoxyethylene chain with a hydroxyl group at the molecular terminal.

However, in the present invention, the monomer corresponding to (xvii) a polymerizable unsaturated monomer having a-UV absorbing functional group described below should be defined as "another polymerizable unsaturated monomer (b) that is copolymerizable with the hydroxyl group-containing polymerizable unsaturated monomer (a)" and is excluded from the "hydroxyl group-containing polymerizable unsaturated monomer (a)". One type of hydroxyl group-containing polymerizable unsaturated monomer (a) can be used alone or two or more types may be combined and used.

In the present specification, a polymerizable unsaturated group means an unsaturated group that is radically polymerizable. Examples of such polymerizable unsaturated groups include a vinyl group, a (meth)acryloyl group, a (meth)acrylamide group, a vinyl ether group, an allyl group, a propenyl group, an isopropenyl group, and a maleimide group.

Note that in the present specification, "(meth)acrylate" means an acrylate or a methacrylate, and "(meth)acrylic acid" means acrylic acid or methacrylic acid. Also, "(meth) acryloyl" means acryloyl or methacryloyl. Furthermore, "(meth)acrylamide" means acrylamide or methacrylamide.

The other polymerizable unsaturated monomer (b) that is copolymerizable with the hydroxyl group-containing polymerizable unsaturated monomer (a) can be appropriately selected and used according to the desired properties of the water-dispersible hydroxyl group-containing acrylic resin (A). Specific examples of the monomer (b) include those described in (i) to (xix) below. These can each be used alone, or two or more types of these monomers can be combined and used.

(i) Alkyl or cycloalkyl (meth)acrylates: such as, for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-hexyl (meth)acrylate, n-octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, and tricyclodecanyl (meth)acrylate.

(ii) Polymerizable unsaturated monomers having an isobornyl group: such as, for example, isobornyl (meth) acrylate.

(iii) Polymerizable unsaturated monomers having an adamantyl group: such as, for example, adamantyl (meth) acrylate.

(iv) Polymerizable unsaturated monomers having a tricyclodecenyl group: such as, for example, tricyclodecenyl (meth)acrylate.

(v) Aromatic ring-containing polymerizable unsaturated monomers: such as, for example, benzyl (meth)acrylate, styrene, α-methylstyrene, and vinyl toluene.

(vi) Polymerizable unsaturated monomers having an alkoxysilyl groups: such as, for example, vinyl trimethoxysilane, vinyltriethoxysilane, vinyltris(2-methoxyethoxy) silane, γ-(meth)acryloyloxypropyl trimethoxysilane, and γ-(meth)acryloyloxypropyl triethoxysilane.

(vii) Polymerizable unsaturated monomers having a fluorinated alkyl group: such as, for example, perfluoroalkyl (meth)acrylates such as perfluorobutyl ethyl (meth)acrylate and perfluorooctyl ethyl (meth)acrylate; and fluoroolefins.

(viii) Polymerizable unsaturated monomers having a photopolymerizable functional group such as a maleimide group.

(ix) Vinyl compounds: such as, for example, N-vinylpyrrolidone, ethylene, butadiene, chloroprene, vinyl propionate, and vinyl acetate.

(x) Carboxyl group-containing polymerizable unsaturated monomers: such as, for example, (meth)acrylic acid, maleic acid, crotonic acid, and β-carboxyethyl acrylate.

(xi) Nitrogen-containing polymerizable unsaturated monomers: such as, for example, (meth)acrylonitrile, (meth) acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth)acrylamide, 2-(methacryloyloxy) ethyltrimethyl ammonium chloride, and adducts of glycidyl (meth)acrylate and amines.

(xii) Polymerizable unsaturated monomers having two or more polymerizable unsaturated groups per molecule: such as, for example, allyl (meth)acrylate, ethylene glycol di(meth)acrylate, 1,4-butanediol di(meth)acrylate, neopentyl glycol di(meth)acrylate, and 1,6-hexanediol di(meth)acrylate.

(xiii) Epoxy group-containing polymerizable unsaturated monomers: such as, for example, glycidyl (meth)acrylate, β-methylglycidyl (meth)acrylate, 3,4-epoxycyclohexyl methyl (meth)acrylate, 3,4-epoxycyclohexyl ethyl (meth) acrylate, 3,4-epoxycyclohexylpropyl (meth)acrylate, and allyl glycidyl ether.

(xiv) (Meth)acrylates having a polyoxyethylene chain with an alkoxy group at the molecular terminal.

(xv) Polymerizable unsaturated monomers having a sulfonic acid group: such as, for example, 2-acrylamido-2-methylpropane sulfonic acid, 2-sulfoethyl (meth)acrylate, allyl sulfonic acid, 4-styrene sulfonic acid, and the like, and sodium salts and ammonium salts of these sulfonic acids.

(xvi) Polymerizable unsaturated monomers having a phosphate group: such as acid phosphoxyethyl (meth)acrylate, acid phosphoxypropyl (meth)acrylate, acid phosphoxypoly(oxyethylene)glycol (meth)acrylate, and acid phosphoxypoly(oxypropylene)glycol (meth)acrylate.

(xvii) Polymerizable unsaturated monomers having a UV-absorbing functional group; such as, for example, 2-hydroxy-4-(3-methacryloyloxy-2-hydroxypropoxy)benzophenone, 2-hydroxy-4-(3-acryloyloxy-2-hydroxypropoxy) benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole.

(xviii) Photostable polymerizable unsaturated monomers: such as, for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Polymerizable unsaturated monomers having a carbonyl group: such as, for example, acrolein, diacetone acrylamide, diacetone methacrylamide, acetoacetoxy ethyl methacrylate, formylstyrol, and C4-7 vinyl alkyl ketones (for example, vinyl methyl ketone, vinyl ethyl ketone, vinyl butyl ketone).

The water-dispersible hydroxyl group-containing acrylic resin (A) can also be used in combination with a so-called urethane-modified acrylic resin, which is elongated and increased in molecular weight by causing a polyisocyanate compound to undergo a urethanization reaction with some of the hydroxyl groups in the resin (A).

The hydroxyl group-containing polymerizable unsaturated monomer (a) can generally be used at an amount in a range of from 1 to 50 mass %, preferably from 2 to 40 mass %, and more preferably from 3 to 30 mass %, based on the total amount of the monomer (a) and the monomer (b).

From the perspectives of storage stability and water resistance of the multi-layer coating film that is formed, the water-dispersible hydroxyl group-containing acrylic resin (A) generally has a hydroxyl value in a range of preferably from 1 to 200 mg KOH/g, particularly preferably from 2 to 150 mg KOH/g, and even more particularly preferably from 5 to 100 mg KOH/g.

From the perspective of water resistance of the multi-layer coating film that is formed, the water-dispersible hydroxyl group-containing acrylic resin (A) generally has an acid value in a range of preferably from 1 to 200 mg KOH/g, particularly preferably from 2 to 150 mg KOH/g, and even more particularly preferably from 5 to 80 mg KOH/g.

From perspectives such as improving the smoothness of the multi-layer coating film that is formed, the water-dispersible hydroxyl group-containing acrylic resin (A) preferably includes a water-dispersible hydroxyl group-containing acrylic resin (A') having a core/shell multi-layer structure including a copolymer (I) as a core portion and a copolymer (II) as a shell portion. The copolymer (I) is obtained by copolymerizing from 0.1 to 30 mass % of a polymerizable unsaturated monomer (c) having at least two polymerizable unsaturated groups per molecule and 70 to 99.9 mass % of a polymerizable unsaturated monomer (d) having one polymerizable unsaturated group per molecule. The copolymer (II) is obtained by copolymerizing from 1 to 35 mass % of a hydroxyl group-containing polymerizable unsaturated monomer (a), from 35 to 80 mass % of a polymerizable unsaturated monomer (e) having a C4-22 hydrocarbon group, and from 0 to 64 mass % of a polymerizable unsaturated monomer (f) other than the hydroxyl group-containing polymerizable unsaturated monomer (a) and the polymerizable unsaturated monomer (e) having a C4-22 hydrocarbon group.

Examples of the polymerizable unsaturated monomer (c) having at least two polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth) acrylate, 1,6-hexanediol di(meth)acrylate, pentaerythritol di(meth)acrylate, pentaerythritol tetra(meth)acrylate, glycerol di(meth)acrylate, 1, 1, 1-tris(hydroxymethyl) ethane di(meth)acrylate, 1, 1, 1-tris(hydroxymethyl) ethane tri (meth)acrylate, 1,1,1-tris(hydroxymethyl) propane tri(meth) acrylate, triallylisocyanurate, diallyltetraphthalate, and divinylbenzene. Each of these can be used alone, or two or more types can be combined and used.

The polymerizable unsaturated monomer (c) having at least two polymerizable unsaturated groups per molecule can generally be used at an amount in a range of from 0.1 to 30 mass %, preferably from 0.5 to 10 mass %, and even more preferably from 1 to 5 mass %, based on the total mass of the monomer (c) and monomer (d).

Furthermore, the polymerizable unsaturated monomer (d) having one polymerizable unsaturated group per molecule is a polymerizable unsaturated monomer that is copolymerizable with the polymerizable unsaturated monomer (c) having at least two polymerizable unsaturated groups per molecule, and includes compounds containing one polymerizable unsaturated group, such as, for example, a vinyl group, a (meth)acryloyl group, and an allyl group, per molecule.

Specific examples of the polymerizable unsaturated monomer (d) having one polymerizable unsaturated group per molecule include alkyl or cycloalkyl (meth)acrylates, such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "isostearyl acrylate" (trade name, available from Osaka Organic Chemical Industry Ltd.), cyclohexyl (meth)acrylate, methylcyclohexyl (meth)acrylate, tert-butyl cyclohexyl (meth) acrylate, and cyclododecyl (meth)acrylate; polymerizable unsaturated monomers having an isobornyl group, such as isobornyl (meth)acrylate; polymerizable unsaturated monomers having an adamantyl group, such as adamantyl (meth) acrylate; vinyl aromatic compounds such as styrene, α-methylstyrene, and vinyl toluene; hydroxyl group-containing polymerizable unsaturated monomers, such as monoesterified products of a C2-8 dihydric alcohol and a (meth)acrylic acid, such as 2-hydroxyethyl (meth)acrylate, 2-hydroxypropyl (meth)acrylate, 3-hydroxypropyl (meth) acrylate, and 4-hydroxybutyl (meth)acrylate, ¿-caprolactone modified products of the monoesterified products of a C2-8 dihydric alcohol and a (meth)acrylic acid, allyl alcohols, and (meth)acrylates having a polyoxyethylene chain with a hydroxyl group at the molecular terminal; carboxyl group-containing polymerizable unsaturated monomers, such as (meth)acrylic acid, maleic acid, crotonic acid, and β-carboxyethyl acrylate; and nitrogen-containing polymerizable unsaturated monomers such as (meth)acrylonitrile, (meth) acrylamide, dimethylaminopropyl (meth)acrylamide, dimethylaminoethyl (meth)acrylate, and adducts of glycidyl (meth)acrylate and amines. Each of these can be used alone, or two or more types can be combined and used.

From perspectives such as smoothness of the multi-layer coating film that is formed, the polymerizable unsaturated monomer (d) having one polymerizable unsaturated group per molecule favorably includes, as at least a portion of the component thereof, a polymerizable unsaturated monomer (h) having one polymerizable unsaturated group per molecule and having an alkyl group with one or two carbons.

From perspectives such as the smoothness of the multi-layer coating film that is formed, of the polymerizable unsaturated monomers (h) having one polymerizable unsaturated group per molecule and having an alkyl group with one or two carbons, the polymerizable unsaturated monomer (h) is preferably at least one polymerizable unsaturated monomer selected from methyl (meth)acrylate and ethyl (meth)acrylate, is more preferably at least one polymerizable unsaturated monomer selected from methyl methacrylate and ethyl acrylate, and is particularly preferably methyl methacrylate, and use of both methyl methacrylate and ethyl acrylate is even more particularly preferable.

The polymerizable unsaturated monomer (h) having one polymerizable unsaturated group per molecule and having an alkyl group with one or two carbons is preferably used at an amount in a range of from 10 to 99.9 mass % based on the total mass of the monomer (c) and monomer (d). Within this range, from perspectives such as smoothness of the multi-layer coating film that is formed, the usage proportion of the polymerizable unsaturated monomer (h) having one polymerizable unsaturated group per molecule and having an alkyl group with one or two carbons is preferably in a range of from 60 to 99.9 mass %, and even more preferably in a range of from 70 to 99.5 mass %, and particularly preferably in a range of from 75 to 99 mass % based on the total mass of the monomer (c) and monomer (d).

On the other hand, as described above, examples of the hydroxyl group-containing polymerizable unsaturated monomer (a), which is a monomer component constituting the shell, include monoesterified products of a C2-8 dihydric alcohol and (meth)acrylic acid, such as 2-hydroxyethyl (meth)acrylate, 2-hydroxypropyl (meth)acrylate, 3-hydroxypropyl (meth)acrylate, and 4-hydroxybutyl (meth) acrylate; ¿-caprolactone modified products of these monoesterified products of a C2-8 dihydric alcohol and (meth) acrylic acid; allyl alcohols; and (meth)acrylates having a polyoxyethylene chain with a hydroxyl group at the molecular terminal. Each of these can be used alone, or two or more types can be combined and used.

The hydroxyl group-containing polymerizable unsaturated monomer (a) can generally be used at an amount in a range of from 1 to 35 mass %, preferably from 5 to 25 mass %, and more preferably from 8 to 20 mass %, based on the total mass of the monomer (a), the monomer (e), and the monomer (f).

Also, as the polymerizable unsaturated monomer (e) having a C4-22 hydrocarbon group, which is a monomer component constituting the shell, a polymerizable unsaturated monomer containing a linear, branched or cyclic, saturated or unsaturated C4-22 hydrocarbon group can be used. Specific examples of the polymerizable unsaturated monomer (e) include alkyl or cycloalkyl (meth)acrylates, such as n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth)acrylate, tridecyl (meth)acrylate, lauryl (meth)acrylate, stearyl (meth) acrylate, "isostearyl acrylate" (trade name, available from Osaka Organic Chemical Industry Ltd.), cyclohexyl (meth)

acrylate, methylcyclohexyl (meth)acrylate, tert-butyl cyclohexyl (meth)acrylate, and cyclododecyl (meth)acrylate; polymerizable unsaturated monomers having an isobornyl group, such as isobornyl (meth)acrylate; polymerizable unsaturated monomers having an adamantyl group, such as adamantyl (meth)acrylate; and vinyl aromatic compounds such as styrene, α-methylstyrene, and vinyl toluene. Each of these can be used alone, or two or more types can be combined and used.

Among the polymerizable unsaturated monomers (e) having a C4-22 hydrocarbon group, from perspectives such as the smoothness of the multi-layer coating film that is formed, the polymerizable unsaturated monomer (e) is preferably a polymerizable unsaturated monomer having a C4-8 alkyl group, and is more preferably a polymerizable unsaturated monomer having a C4-6 alkyl group. Among these, at least one butyl (meth)acrylate selected from n-butyl (meth) acrylate, isobutyl (meth)acrylate and tert-butyl (meth)acrylate is preferable, n-butyl (meth)acrylate is more preferable, and n-butyl acrylate is particularly preferable.

The polymerizable unsaturated monomer (e) having a C4-22 hydrocarbon group is generally used at an amount in a range of preferably from 35 to 80 mass %, more preferably from 40 to 70 mass %, and even more preferably from 45 to 65 mass %, based on the total amount of the monomer (a), the monomer (e), and the monomer (f).

In addition, when at least one butyl (meth)acrylate selected from n-butyl (meth)acrylate, isobutyl (meth)acrylate, and tert-butyl (meth)acrylate is used as at least one type of the polymerizable unsaturated monomer (e) having a C4-22 hydrocarbon group, the total amount of the butyl (meth)acrylate is generally preferably in a range of from 35 to 70 mass %, particularly preferably from 40 to 65 mass %, and even more particularly preferably from 45 to 60 mass %, based on the total amount of the monomer (a), the monomer (e), and the monomer (f).

Examples of the polymerizable unsaturated monomer (f) other than the hydroxyl group-containing polymerizable unsaturated monomer (a) constituting the shell and the polymerizable unsaturated monomer (e) having a C4-22 hydrocarbon group can include alkyl (meth)acrylates such as methyl (meth)acrylate, ethyl (meth)acrylate, n-propyl (meth)acrylate, and isopropyl (meth)acrylate; and carboxyl group-containing polymerizable unsaturated monomers such as a (meth)acrylic acid, maleic acid, crotonic acid, and β-carboxyethyl acrylate. Each of these can be used alone, or two or more types can be combined and used.

From perspectives such as the smoothness of the multi-layer coating film that is formed, at least a portion of the polymerizable unsaturated monomer (f) other than the hydroxyl group-containing polymerizable unsaturated monomer (a) and the polymerizable unsaturated monomer (e) having a C4-22 hydrocarbon group preferably includes a carboxyl group-containing polymerizable unsaturated monomer (g).

Examples of the carboxyl group-containing polymerizable unsaturated monomer (g) include (meth)acrylic acid, maleic acid, crotonic acid, and β-carboxyethyl acrylate, and of these, (meth)acrylic acid is suitable.

From perspectives such as stability of the water-dispersible hydroxyl group-containing acrylic resin (A') in the aqueous medium and the smoothness and water resistance of the multi-layer coating film that is formed, the carboxyl group-containing polymerizable unsaturated monomer (g) is generally used at an amount in a range of preferably from 1 to 40 mass %, particularly preferably from 6 to 25 mass %, and even more particularly preferably from 11 to 19 mass %, based on the total mass of the monomer (a), the monomer (e), and the monomer (f).

From perspectives such as smoothness and water resistance of the multi-layer coating film that is formed, the water-dispersible hydroxyl group-containing acrylic resin (A') generally has a hydroxyl value in a range of preferably from 1 to 70 mg KOH/g, particularly preferably from 2 to 60 mg KOH/g, and even more particularly preferably from 5 to 45 mg KOH/g.

In addition, from perspectives such as storage stability and the smoothness and water resistance of the multi-layer coating film that is formed, the water-dispersible hydroxyl group-containing acrylic resin (A') generally has an acid value in a range of preferably from 5 to 90 mg KOH/g, particularly preferably from 10 to 70 mg KOH/g, and even more particularly preferably from 15 to 50 mg KOH/g.

From perspectives such as the smoothness of the multi-layer coating film that is formed, a polymerizable unsaturated monomer having only one polymerizable unsaturated group per molecule is preferably used as the monomer (a), the monomer (e), and the monomer (f), and the shell of the water-dispersible hydroxyl group-containing acrylic resin (A') is preferably not crosslinked.

The water-dispersible hydroxyl group-containing acrylic resin (A') can be obtained by, for example, adding a monomer mixture (II) into an emulsion and further polymerizing the contents thereof. The emulsion is obtained by emulsion polymerization of a monomer mixture (I) containing from 0.1 to 30 mass % of the polymerizable unsaturated monomer (c) having at least two polymerizable unsaturated groups per molecule and 70 to 99.9 mass % of the polymerizable unsaturated monomer (d) having one polymerizable unsaturated group per molecule. The monomer mixture (II) contains from 1 to 35 mass % of the hydroxyl group-containing polymerizable unsaturated monomer (a), from 35 to 80 mass % of the polymerizable unsaturated monomer (e) having a C4-22 hydrocarbon group, and from 0 to 64 mass % of the polymerizable unsaturated monomer (f) other than the monomer (a) and the monomer (d).

The emulsion polymerization of the above monomer mixture (I) can be carried by a known method, for example, using a polymerization initiator in the presence of an emulsifier.

As the emulsifier, anionic emulsifiers or nonionic emulsifiers are suitable. Examples of the anionic emulsifier include sodium salts and ammonium salts of organic acids such as alkyl sulfonic acid, alkylbenzene sulfonic acid, and alkylphosphoric acid. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

A polyoxyalkylene group-containing anionic emulsifier having, per molecule, an anionic group and a polyoxyalkylene group such as a polyoxyethylene group or a polyoxypropylene group, or a reactive anionic emulsifier having, per molecule, the anionic group and a radically polymerizable unsaturated group may be used, and of these, use of a reactive anionic emulsifier is suitable.

Examples of the reactive anionic emulsifier include sodium salts and ammonium salts of sulfonic acid compounds having a radically polymerizable unsaturated group such as a (meth)allyl group, a (meth)acryloyl group, a propenyl group, and a butenyl group. Of these, an ammonium salt of a sulfonic acid compound having a radically polymerizable unsaturated group is preferred because of the excellent water resistance of the multi-layer coating film that is formed. Examples of the ammonium salt of a sulfonic acid compound include commercially available products such as "Latemul S-180A" (trade name, available from Kao Corporation).

Among the ammonium salts of sulfonic acid compounds having a radically polymerizable unsaturated group, an ammonium salt of a sulfonic acid compound having a radically polymerizable unsaturated group and a polyoxyalkylene group is more preferable. Examples of ammonium salts of sulfonic acid compounds having a radically polymerizable unsaturated group and a polyoxyalkylene group include commercially available products such as "Aqualon KH-10" (trade name, available from DKS Co., Ltd.) and "SR-1025A" (trade name, available from Adeka Corporation).

The emulsifier is usually used at an amount in a range of from 0.1 to 15 mass %, preferably from 0.5 to 10 mass %, and more preferably from 1 to 5 mass %, based on the total amount of all monomers that are used.

The polymerization initiator may be oil-soluble or water-soluble, and examples include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropyl benzene hydroperoxide; azo compounds such as azobis isobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methylproprionate), azobis [2-methyl-N-(2-hydroxyethyl)-propionamide], and azobis {2-methyl-N-[2-(1-hydroxybutyl)]-propionamide}; and persulfates such as potassium persulfate, ammonium persulfate, and sodium persulfate. Each of these can be used alone, or two or more types can be combined and used.

Furthermore, as necessary, a reducing agent such as a sugar, sodium formaldehyde sulfoxylate, and an iron complex may be used in combination with the polymerization initiator, and a redox polymerization system may be formed.

The polymerization initiator is ordinarily used at an amount in a range of preferably from 0.1 to 5 mass %, and particularly preferably from 0.2 to 3 mass %, based on the total mass of all monomers that are used. The method of adding the polymerization initiator is not particularly limited, and can be appropriately selected according to the type, amount, and the like of the polymerization initiator. For example, the polymerization initiator may be contained in a monomer mixture or an aqueous medium in advance, or may be added all at once or added dropwise at the time of polymerization.

The water-dispersible hydroxyl group-containing acrylic resin (A') can be obtained by adding the monomer mixture (II) containing the hydroxyl group-containing polymerizable unsaturated monomer (a), the polymerizable unsaturated monomer (e) having a C4-22 hydrocarbon group, and the polymerizable unsaturated monomer (f) other than the monomer (a) and the monomer (e) to the emulsion obtained as described above, and further performing polymerization.

As necessary, the monomer mixture (II) can contain, as appropriate, components such as a polymerization initiator like those listed above, a chain transfer agent, a reducing agent, and an emulsifier.

In addition, while the monomer mixture (II) can be added dropwise as is, the monomer mixture (II) is desirably dispersed in an aqueous medium and added dropwise as a monomer emulsion. The particle size of the monomer emulsion in this case is not particularly limited.

Polymerization of the monomer mixture (II) can be implemented by, for example, adding the monomer mixture (II), which may be emulsified, to the above-mentioned emulsion all at once or in a dropwise manner, and then heating to an appropriate temperature while stirring.

The water-dispersible hydroxyl group-containing acrylic resin (A') obtained as described above can have a core/shell multi-layer structure including a copolymer (I) as a core and a copolymer (II) as a shell, the copolymer (I) being formed from the monomer mixture (I) containing the polymerizable unsaturated monomer (c) having at least two polymerizable unsaturated groups per molecule and the polymerizable unsaturated monomer (d) having one polymerizable unsaturated group per molecule, and the copolymer (II) being formed from the monomer mixture (II) containing the hydroxyl group-containing polymerizable unsaturated monomer (a), the polymerizable unsaturated monomer (e) having a C4-22 hydrocarbon group, and the polymerizable unsaturated monomer (f) other than the monomer (a) and the monomer (e).

Furthermore, the water-dispersible hydroxyl group-containing acrylic resin (A') may be formed as resin particles having three or more layers by adding, between the step of obtaining the copolymer (I) and the step of obtaining the copolymer (II), a step of supplying a polymerizable unsaturated monomer (one type or a mixture of two or more types) that forms another resin layer, and implementing emulsion polymerization.

Note that in the present invention, the "shell" of the water-dispersible hydroxyl group-containing acrylic resin (A') refers to the polymer layer present in the outermost layer of the resin particle, the "core" means the polymer layer of the inner layer of the resin particle excluding the shell portion, and the "core/shell structure" means a structure having the core and the shell. The core/shell structure described above is typically a layer structure in which the core is completely covered by the shell, but depending on the mass ratio and the like of the core and shell, the amount of the monomer of the shell may be insufficient for forming a layer structure. In such a case, it is not necessary to have a complete layer structure as described above, and the structure may be a structure in which a portion of the core is covered by the shell, or a structure in which a polymerizable unsaturated monomer that is a constituent element of the shell is graft polymerized with a portion of the core. Furthermore, the concept of a multi-layer structure with regard to the core/shell structure is also similarly applicable in a case in which a multi-layer structure is formed in the core in the water-dispersible hydroxyl group-containing acrylic resin (A')

From perspectives such as smoothness of the multi-layer coating film that is formed, the ratio of the copolymer (I) and the copolymer (II) in the water-dispersible hydroxyl group-containing acrylic resin (A') having a core/shell multi-layer structure is, in terms of a solid content mass ratio of the copolymer (I)/copolymer (II), preferably in a range of from 10/90 to 90/10, particularly preferably from 50/50 to 85/15, and more particularly preferably from 65/35 to 80/20.

The water-dispersible hydroxyl group-containing acrylic resin (A) can generally have an average particle size in a range of from 10 to 1000 nm, and in particular from 20 to 500 nm. Within this range, from the perspective of smoothness and brightness of the multi-layer coating film that is formed, the average particle size of the water-dispersible hydroxyl group-containing acrylic resin (A') is preferably in a range of from 30 to 180 nm, and more preferably in a range of from 40 to 150 nm.

Note that, in the present specification, the average particle size of the water-dispersible hydroxyl group-containing acrylic resin (A) is a value measured at 20° C. using a particle size distribution measurement device based on a dynamic light scattering method after dilution with deionized water by a common method. As the particle size distribution measurement device based on the dynamic light scattering method, for example, the "Submicron Particle Analyzer N5" (trade name, available from Beckman Coulter Inc.) can be used.

To improve the mechanical stability of the water dispersion particles of the obtained water-dispersible hydroxyl group-containing acrylic resin (A'), the acidic groups of the water-dispersible hydroxyl group-containing acrylic resin (A'), such as the carboxyl group, are desirably neutralized by a neutralizing agent. The neutralizing agent can be used without any particular limitation as long as it can neutralize the acidic groups. Examples include sodium hydroxide, potassium hydroxide, trimethylamine, 2-(dimethylamino) ethanol, 2-amino-2-methyl-1-propanol, triethylamine, and ammonia water. These neutralizing agents are preferably used at an amount such that the pH of the aqueous dispersion of the water-dispersible hydroxyl group-containing acrylic resin (A') after neutralization is from approximately 6.5 to approximately 9.0.

Hydroxyl Group-Containing Polyester Resin

The second water-based paint (P2) preferably further contains a hydroxyl group-containing polyester resin from perspectives such as the smoothness and brightness of the multi-layer coating film that is formed.

The hydroxyl group-containing polyester resin can be ordinarily produced by an esterification reaction or a transesterification reaction between an acid component and an alcohol component.

As the acid component, a compound commonly used as an acid component in the production of a polyester resin can be used. Examples of such an acid component include aliphatic polybasic acids, alicyclic polybasic acids, and aromatic polybasic acids.

The aliphatic polybasic acid is generally an aliphatic compound having two or more carboxyl groups per molecule, an acid anhydride of the aliphatic compound, and an esterified product of the aliphatic compound. Examples of the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polybasic carboxylic acids; and esterified products of around C1-4 lower alkyls of the aliphatic polybasic carboxylic acids. The aliphatic polybasic acids can be used alone, or two or more types thereof can be combined and used.

From the perspective of smoothness of the multi-layer coating film that is formed, at least one type of aliphatic polybasic acid selected from the group consisting of succinic acid, succinic anhydride, adipic acid, and adipic anhydride is preferably used as at least one type of the aliphatic polybasic acid.

The alicyclic polybasic acid is generally a compound having one or more alicyclic structures and two or more carboxyl groups per molecule, an acid anhydride of the compound, or an esterified product of the compound. The alicylic structure is primarily a ring structure of four to six members. Examples of the alicyclic polybasic acid include alicyclic polybasic carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, and 1,3,5-cyclohexane tricarboxylic acid; anhydrides of the alicyclic polybasic carboxylic acids; and esterified products of around C1-4 lower alkyls of the alicyclic polybasic carboxylic acids. The alicyclic polybasic acids can be used alone, or two or more types thereof can be combined and used.

From the perspective of smoothness of the multi-layer coating film that is formed, at least one alicyclic polybasic acid selected from the group consisting of 1,2-cyclohexane dicarboxylic acid, 1,2-cyclohexane dicarboxylic anhydride, 1,3-cyclohexane dicarboxylic acid, 1,4-cyclohexane dicarboxylic acid, 4-cyclohexene-1,2-dicarboxylic acid, and 4-cyclohexene-1,2-dicarboxylic anhydride is preferably used as at least one type of the alicyclic polybasic acid, and of these, use of 1,2-cyclohexane dicarboxylic acid and/or 1,2-cyclohexane dicarboxylic anhydride is preferable.

The aromatic polybasic acid is generally an aromatic compound having two or more carboxyl groups per molecule, an acid anhydride of the aromatic compound, or an esterified product of the aromatic compound. Examples of the aromatic polybasic acid include aromatic polybasic carboxylic acids, such as phthalic acid, isophthalic acid, terephthalic acid, naphthalene dicarboxylic acid, 4,4'-biphenyl dicarboxylic acid, trimellitic acid, and pyromellitic acid; anhydrides of these aromatic polybasic carboxylic acids; and esterified products of around C1-4 lower alkyls of these aromatic polybasic carboxylic acids. The aromatic polybasic acids can be used alone, or two or more types thereof can be combined and used.

At least one type of aromatic polybasic acid selected from the group consisting of phthalic acid, phthalic anhydride, isophthalic acid, trimellitic acid, and trimellitic anhydride is preferably used as at least one type of the aromatic polybasic acid.

Also, an acid component other than the aliphatic polybasic acid, the alicyclic polybasic acid, and the aromatic polybasic acid can be used. Such acid component is not particularly limited, and examples include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid and 3-hydroxy-4-ethoxybenzoic acid. These acid components can be used alone or in a combination of two or more types.

As the alcohol component, a polyhydric alcohol having two or more hydroxyl groups per molecule can be suitably used. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyl trimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentylglycol, 1,4-cyclohexane dimethanol, tricyclodecane dimethanol, neopentylglycol hydroxypivalate, hydrogenated bisphenol A, hydrogenated bisphenol F, and dimethylol propionate; polylactone diols obtained by adding a lactone compound such as ε-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, and polybutylene glycol; trihydric and higher polyhydric alcohols, such as glycerin, trimethylol ethane, trimethylol propane, diglycerin, triglycerin, 1,2,6-hexanetriol, pentaerythritol, dipentaerythritol, tris(2-hydroxyethyl) isocyanurate, sorbitol, and mannitol; polylactone polyol compounds obtained by adding a lactone compound such as ε-caprolactone to these trihydric and higher polyhydric alcohols; and fatty acid ester compounds of glycerin.

Furthermore, an alcohol component other than the polyhydric alcohols described above can be used. Such an alcohol component is not particularly limited, and examples include monoalcohols such as methanol, ethanol, propyl alcohol, butyl alcohol, stearyl alcohol, and 2-phenoxyethanol; and alcohol compounds obtained by reacting an acid with a monoepoxy compound such as a propylene oxide, butylene oxide, and "Cardura E10P" (trade name, glycidyl ester of a synthetic highly-branched saturated fatty acid, available from Hexion Inc.).

The method for producing a hydroxyl group-containing polyester resin is not particularly limited, and the hydroxyl group-containing polyester resin can be produced according to a typical method. For example, a method can be used in which the acid component and the alcohol component are heated at approximately 150 to 250° C. in a nitrogen stream for approximately 5 to 10 hours, and the acid component and the alcohol component are subjected to an esterification reaction or a transesterification reaction to thereby produce the hydroxyl group-containing polyester resin.

When the acid component and the alcohol component are to be subjected to the esterification reaction or transesterification reaction, these components may be added all at once into a reaction vessel, or one or both components may be added in multiple batches. Also, first, the hydroxyl group-containing polyester resin may be synthesized, and then an acid anhydride may be reacted with the obtained hydroxyl group-containing polyester resin to form a half-ester and obtain a carboxyl group- and hydroxyl group-containing polyester resin. In addition, first, the carboxyl group-containing polyester resin may be synthesized, and then the alcohol component may be added to obtain a hydroxyl group-containing polyester resin.

For the esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

Furthermore, the hydroxyl group-containing polyester resin can be modified with a fatty acid, a monoepoxy compound, a polyisocyanate compound, or the like during or after preparation of the resin.

Examples of the fatty acid include coconut oil fatty acid, a cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, a dehydrated castor oil fatty acid, and safflower oil fatty acid. Further, as the monoepoxy compound, for example, "Cardura E10P" (trade name, glycidyl ester of a synthetic highly-branched saturated fatty acid, available from Hexion Inc.) can be suitably used.

Moreover, examples of the polyisocyanate compound include aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylene bis(cyclohexyl isocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent and higher valent polyisocyanates such as lysine triisocyanate; adducts of each of these organic polyisocyanates with a polyhydric alcohol, a low molecular weight polyester resin, water, or the like; and cyclized polymers (for example, isocyanurate) and biuret-type adducts of each of these organic polyisocyanates. These polyisocyanate compounds can be used alone, or two or more types thereof can be mixed and used.

Furthermore, from the perspective of achieving excellent smoothness and the like of the multi-layer coating film that is formed, the content of the alicyclic polybasic acid in the acid component of the raw materials of the hydroxyl group-containing polyester resin is preferably in a range of from 20 to 100 mol %, more preferably in a range of from 25 to 95 mol %, and even more preferably in a range of from 30 to 90 mol %, based on the total amount of the acid component. In particular, from the perspective of achieving excellent smoothness and the like of the multi-layer coating film that is formed, the alicyclic polybasic acid is preferably a 1,2-cyclohexane dicarboxylic acid and/or a 1,2-cyclohexane dicarboxylic anhydride.

The hydroxyl value of the hydroxyl group-containing polyester resin is preferably in a range of from 1 to 200 mg KOH/g, more preferably in a range of from 2 to 180 mg KOH/g, and particularly preferably in a range of from 5 to 170 mg KOH/g. Also, when the hydroxyl group-containing polyester resin further includes a carboxyl group, the acid value thereof is preferably in a range of from 5 to 150 mg KOH/g, more preferably in a range of from 10 to 100 mg KOH/g, and particularly preferably in a range of from 15 to 80 mg KOH/g. Furthermore, the number average molecular weight of the hydroxyl group-containing polyester resin is preferably in a range of from 500 to 50000, more preferably in a range of from 1000 to 6000, and particularly preferably in a range of from 1200 to 4000.

Furthermore, from perspectives such as the brightness, smoothness, and storage stability of the multi-layer coating film that is formed, at least one type of curing agent selected from melamine resin and a blocked polyisocyanate compound is included as at least one type of the curing agent, and melamine resin is more preferably included.

Also, the proportions of the base resin and the curing agent in the resin composition are not particularly limited, but ordinarily, the curing agent is used at a proportion in a range of from 10 to 100 mass %, preferably from 20 to 80 mass %, and more preferably from 30 to 60 mass %, based on the total solid content of the base resin.

The second water-based paint (P2) preferably further contains a pigment. Examples of the pigment include color pigments, bright pigments, and extender pigments.

When the second water-based paint (P2) contains the above-mentioned color pigment, the color pigment is not particularly limited, and similar to the case of the first colored paint (P1), one type of a known color pigment can be used alone, or two or more types can be combined and used. From the perspective of improving the identification ease of the second water-based paint (P2) at the application site, carbon black is preferably used as at least one type of the color pigment.

When the second water-based paint (P2) contains the color pigment, the content of the color pigment is preferably in a range of from 0.003 to 10 parts by mass, and more preferably in a range of from 0.005 to 7.0 parts by mass, based on 100 parts by mass of the total solid content of the binder component in the second water-based paint (P2).

When the second water-based paint (P2) contains the bright pigment described above, the bright pigment is not particularly limited, and one type of a known bright pigment can be used alone, or two or more types can be combined and used. As the bright pigment, for example, a bright pigment described in the explanation of a bright pigment (BP3) in a third water-based colored paint (P3) described below can be used. From the perspectives of brightness and smoothness of the multi-layer coating film that is formed, at least one type of bright pigment selected from the group consisting of aluminum flake pigments, vapor-deposited aluminum flake pigments, colored aluminum flake pigments, metal oxide coated mica pigments, and metal oxide coated alumina flake pigments is preferably used as the bright pigment, and among these, use of an aluminum flake pigment and/or a metal oxide coated alumina flake pigment is more preferable.

When the second water-based paint (P2) contains the bright pigment described above, the content of the bright pigment is preferably in a range of from 0.1 to 20 parts by mass, more preferably in a range of from 0.5 to 18 parts by mass, and particularly preferably in a range of from 1 to 16 parts by mass, based on 100 parts by mass of the total solid content of the binder component in the second water-based paint (P2).

When the second water-based paint (P2) contains the extender pigment described above, the extender pigment is not particularly limited, and one type of a known extender pigment can be used alone, or two or more types can be combined and used. Examples of the extender pigment include barium sulfate, barium carbonate, calcium carbonate, talc, and silica. From perspectives such as the brightness, smoothness, and chipping resistance of the multi-layer coating film that is formed, barium sulfate and/or talc is preferably used as at least one type of extender pigment, and from perspectives such as the brightness and smoothness of the multi-layer coating film that is formed, barium sulfate is more preferably used.

When the second water-based paint (P2) contains the extender pigment described above, the content of the extender pigment is preferably in a range of from 0.1 to 30 parts by mass, more preferably in a range of from 2.5 to 25 parts by mass, and particularly preferably in a range of from 5 to 20 parts by mass, based on 100 parts by mass of the total solid content of the binder component in the second water-based paint (P2).

The second water-based paint (P2) preferably further contains a hydrophobic organic solvent from perspectives such as the smoothness and brightness of the multi-layer coating film that is formed.

The hydrophobic organic solvent is desirably an organic solvent having a mass dissolved in 100 g of water at 20° C. of 10 g or less, preferably 5 g or less, and more preferably 1 g or less. Examples of such hydrophobic organic solvents include alcohol-based hydrophobic organic solvents, such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, and propylene glycol mono-phenyl ether; hydrocarbon-based hydrophobic organic solvents, such as rubber volatile oil, mineral spirits, toluene, xylene, and solvent naphtha; ester-based hydrophobic organic solvents, such as n-butyl acetate, isobutyl acetate, isoamyl acetate, methylamyl acetate, ethylene glycol monobutyl ether acetate; and ketone-based hydrophobic organic solvents, such as methyl isobutyl ketone, cyclohexanone, ethyl n-amyl ketone, and diisobutyl ketone. These hydrophobic organic solvents can be used alone or in a combination of two or more types.

From the perspective of improving the smoothness and brightness of the obtained multi-layer coating film, as at least one type of the hydrophobic organic solvent, an alcohol-based hydrophobic organic solvent is preferably contained, and an alcohol-based hydrophobic organic solvent of a C7-14 alcohol is more preferably contained. The second water-based paint (P2) preferably contains, among these hydrophobic organic solvents, at least one type of alcohol-based hydrophobic organic solvent selected from the group consisting of 1-octanol, 2-octanol, 2-ethyl-1-hexanol, ethylene glycol mono-2-ethylhexyl ether, propylene glycol mono-n-butyl ether and dipropylene glycol mono-n-butyl ether, and more preferably contains at least one type of alcohol-based hydrophobic organic solvent selected from the group consisting of 1-octanol, 2-ethyl-1-hexanol and ethylene glycol mono-2-ethylhexyl ether. The second water-based paint (P2) preferably contains, among these hydrophobic organic solvents, 2-ethyl-1-hexanol and/or ethylene glycol mono-2-ethylhexyl ether, and particularly preferably contains 2-ethyl-1-hexanol.

When the water-based paint composition of the present invention contains the hydrophobic organic solvent described above, the blended amount of the hydrophobic organic solvent is preferably in a range of from 2 to 70 parts by mass, and more preferably in a range of from 11 to 60 parts by mass, based on 100 parts by mass of the total solid content of the binder component in the second water-based paint (P2). Within this range, the blended amount of the hydrophobic organic solvent is preferably in a range of from 16 to 50 parts by mass, and even more preferably in a range of from 21 to 45 parts by mass.

Various additives and the like can be blended, as appropriate, into the second water-based paint (P2), examples of the various additives including a curing catalyst, a defoaming agent, an antioxidant, a UV absorber, a light stabilizer, a thickener, a surface conditioner, and a pigment dispersing agent.

The second water-based paint (P2) has a specific viscosity property. Specifically, a viscosity (V2P2) of the second water-based paint (P2) one minute after application is in a range of from 3 to 500 Pa·sec when measured under conditions including a shear rate of 0.1 sec-1 and a temperature of 23° C., and a ratio (V2P2)/(V1P2) of the viscosity (V2P2)

one minute after application to a viscosity (V1P2) of the second water-based paint (P2) measured under conditions including a shear rate of 0.1 sec-1 and a temperature of 23° C. is in a range of from 1.1/1 to 5/1. The viscosity (V2P2) of the second water-based paint (P2) one minute after application is preferably in a range of from 20 to 500 Pa·sec, and more preferably in a range of from 30 to 400 Pa·sec. Also, the ratio (V2P2)/(V1P2) is preferably in a range of from 1.2/1 to 4.5/1, and more preferably in a range of from 1.3/1 to 4/1.

The viscosity (V1P2) of the second water-based paint (P2) measured under conditions including a shear rate of 0.1 sec-1 and a temperature of 23° C. is preferably in a range of from 20 to 300 Pa·sec, more preferably in a range of from 30 to 250 Pa·sec, and even more preferably in a range of from 40 to 200 Pa·sec.

In the present specification, the viscosity (V2P2) of the second water-based paint (P2) one minute after application is obtained by applying the second water-based paint (P2) once onto a tin plate having a length of 45 cm, a width of 30 cm, and a thickness of 0.8 mm using the "ABB Cartridge Bell Coater" (trade name, available from ABB Ltd.), which is a rotary atomizing-type bell coater, under conditions including a bell diameter of 77 mm, a bell rotational speed of 25000 rpm, a shaping air flow rate of 700 NL/min, an applied voltage of −60 kV, a temperature of 23° C. and a humidity of 75%, the second water-based paint (P2) being applied such that the dried film thickness is 12 μm, then scraping off and sampling a portion of the coating film using a spatula or the like one minute after application of the second water-based paint (P2) onto the tin plate, and measuring the viscosity at a shear rate of 0.1 sec-1 using a viscoelasticity measuring device when the shear rate is varied from 10000 sec-1 to 0.0001 sec-1 at a temperature of 23° C. The HAAKE RheoStress RS150 (trade name, available from HAAKE) can be used as the viscoelasticity measuring device.

The viscosity (V1P2) of the second water-based paint (P2) measured under conditions including a shear rate of 0.1 sec-1 and a temperature of 23° C. is the viscosity measured using the viscoelasticity measuring device at a shear rate of 0.1 sec-1 when the shear rate is varied from 10000 sec-1 to 0.0001 sec-1 at a temperature of 23° C. The HAAKE RheoStress RS150 (trade name, available from HAAKE) can be used as the viscoelasticity measuring device.

Note that NL/min, which is the unit of the shaping air flow rate, is a unit commonly used in a surface area flow meter for gas measurements, and is obtained by converting the volume of shaping air that passes through piping in one minute to a volume in a reference state (0° C., 1 atmospheric pressure [atm]).

The method for adjusting the viscosity property of the second water-based paint (P2) to within the above range is not particularly limited. Examples of the method include adjusting the proportion of the solid content and color pigment in the paint composition, adjusting the degree of hydrophobicity of the resin component, adjusting the molecular weight, and blending a rheology control agent. The viscosity property can be adjusted to the above-mentioned viscosity by using one of these methods alone or combining these methods, as appropriate.

Examples of the above-mentioned rheology control agent include acrylic associative thickeners, such as an acrylic resin having a hydrophilic moiety and a hydrophobic moiety, preferably an acrylic resin having a hydrophilic acrylic main chain and a hydrophobic side chain; urethane associative thickeners having a hydrophobic moiety, a urethane bond, and a polyether chain per molecule, and effectively exhibiting, in an aqueous medium, a thickening action through association of the hydrophobic moieties (examples of commercially available urethane associative thickeners include Adeka NOL UH-814N, Adeka NOL UH-462, Adeka NOL UH-420, Adeka NOL UH-472, Adeka NOL UH-540, and Adeka NOL UH-756VF available from Adeka Corporation, and SN Thickener 612, SN Thickener 621N, SN Thickener 625N, and SN Thickener 627N available from San Nopco Ltd.); inorganic thickeners, such as silicates, metal silicates, montmorillonite, organic montmorillonite, and colloidal alumina; polyacrylic acid-based thickeners, such as sodium polyacrylate, and polyacrylic acid-(meth)acrylate copolymers; cellulose derivative-based thickeners, such as carboxymethyl cellulose, methyl cellulose, and hydroxyethyl cellulose; protein-based thickeners, such as casein, sodium caseinate, and ammonium caseinate; alginic acid-based thickeners, such as sodium alginate; polyvinyl-based thickeners, such as polyvinyl alcohol, polyvinylpyrrolidone, and polyvinyl benzyl ether copolymers; polyether-based thickeners, such as pluronic polyether, polyether dialkyl ester, polyether dialkyl ether, and polyether epoxy-modified products; maleic anhydride copolymer-based thickeners, such as partial esters of vinyl methyl ether-maleic anhydride copolymers; and polyamide-based thickeners, such as polyamide amine salts. Of these thickeners, use of an acrylic associative thickener and/or a urethane associative thickener is preferable, and use of an acrylic associative thickener is particularly preferable. These rheology control agents can be used alone, or two or more types can be combined and used.

In addition, from the perspective of the brightness and smoothness of the multi-layer coating film that is formed, the second water-based paint (P2) is preferably adjusted to have the specific viscosity property described above by using, as at least one of the base resins, the water-dispersible hydroxyl group-containing acrylic resin (A') having the core/shell multi-layer structure, and using, as the rheology control agent, the above-mentioned acrylic associative thickener and/or urethane associative thickener, and more preferably the acrylic associative thickener.

The second water-based paint (P2) can be prepared by dissolving or dispersing the aforementioned components in water or a medium (aqueous medium) containing water as a main component. From perspectives such as brightness and smoothness, the paint solid content concentration (NVP2) of second water-based paint (P2) is appropriately in a range of from 16 to 50 mass %, preferably in a range of from 18 to 40 mass %, and more preferably in a range of from 20 to 35 mass %.

By adjusting the viscosity property of the second water-based paint (P2) to the range described above and adjusting the paint solid content concentration (NVP2) of the second water-based paint (P2) in this manner, a multi-layer coating film having excellent smoothness and brightness can be formed along with the first colored coating film and the third colored coating film formed above and below therein.

In addition, in terms of a relationship with the paint solid content concentration (NVP3) of a third water-based paint (P3) described below, the paint solid content concentration (NVP2) of the second water-based paint (P2) is preferably such that NVP2/NVP3 is in a range of from 1.1/1 to 25/1, and is more preferably such that NVP2/NVP3 is in a range of from 1.2/1 to 20/1. Within these ranges, NVP2/NVP3 is more preferably in a range of from 1.3/1 to 15/1, and NVP2/NVP3 is particularly preferable in a range of from 1.5/1 to 10/1.

By adjusting the viscosity property of the second water-based paint (P2) to the range described above and adjusting the NVP2 and NVP3 in this manner, a multi-layer coating film having excellent smoothness and brightness can be formed along with the first colored coating film and the third colored coating film formed above and below therein.

As necessary, the second water-based paint (P2) can be applied using a known coating method, such as electrostatic coating, air spraying, or air-less spraying.

The film thickness of the second coating film formed from the second water-based paint (P2) is, in terms of a cured film thickness (TP2), in a range of from 5 to 20 μm, preferably in a range of from 6 to 16 μm, and more preferably in a range of from 7 to 14 m.

By adjusting the viscosity property of the second water-based paint (P2) to the range described above and adjusting the film thickness of the second coating film formed from the second water-based paint (P2) to within a certain range, a multi-layer coating film having excellent smoothness and brightness can be formed along with the first colored coating film and the third colored coating film formed above and below therein.

Additionally, the cured film thickness (TP2) of the second coating film is such that in terms of a relationship with a cured film thickness (TP3) of the third colored coating film described below, TP2/TP3 is preferably in a range of from 1.1/1 to 40/1, and TP2/TP3 is more preferably in a range of from 1.3/1 to 20/1. Within these ranges, TP2/TP3 is more preferably in a range of from 1.5/1 to 12/1, and TP2/TP3 is particularly preferably in a range of from 2/1 to 8/1.

By adjusting the viscosity property of the second water-based paint (P2) to the range described above and adjusting TP2 and TP3 in this manner, a multi-layer coating film having excellent smoothness and brightness can be formed along with the first colored coating film and the third colored coating film formed above and below therein.

The second coating film is left uncured and supplied to the formation of the third colored coating film in the next step (4), after which in a step (6) described below, the second coating film, the third colored coating film and the clear coating film formed in steps (3) to (5) are heated and cured together. Also, if necessary, before forming the third colored coating film in the next step (4), the second coating film may be directly or indirectly heated through a method such as preheating or air blowing at a temperature of approximately 50 to approximately 110° C. and preferably from approximately 60 to approximately 90° C. for around 1 to 60 minutes. Of these, heating is preferably not implemented between the above-described steps (3) and (4) from perspectives such as reduction in usage energy, shortening of the coating line, and adhesion of the multi-layer coating film formed.

[Formation of Third Colored Coating Film]

In step (4), a third water-based colored paint (P3) that is a water-based paint is applied onto the uncured second coating film obtained in step (3), and a third colored coating film having a cured film thickness (TP3) in a range of from 0.5 to 7 μm is formed. Here, the third water-based colored paint (P3) is a water-based colored paint containing a binder component (AP3) and a bright pigment (BP3), and has a specific paint solid content concentration (NVP3).

The binder component (AP3) used in the third water-based colored paint (P3) can be appropriately selected from the base resins and curing agents listed in the description of the binder component used in the second water-based paint (P2).

The bright pigment ($B_{P3}$) blended in the third water-based colored paint (P3) is a pigment that is used for the purpose of imparting brightness to the coating film. The bright pigment ($B_{P3}$) is preferably a scale-shaped pigment. Such a bright pigment is not particularly limited, and one type of various bright pigments used in the paint field can be used, or two or more types thereof can be combined and used. Specific examples of such bright pigments include aluminum flake pigments, vapor-deposited aluminum flake pigments, metal oxide-coated aluminum flake pigments, colored aluminum flake pigments, metal oxide-coated mica pigments, metal oxide-coated alumina flake pigments, metal oxide-coated glass flake pigments, and metal oxide-coated silica flake pigments. Also, for example, titanium oxide, iron oxide, and the like can be used as the metal oxide that covers the bright pigment.

Of these, from the perspectives of brightness and smoothness of the multi-layer coating film that is formed, at least one type of bright pigment selected from the group consisting of aluminum flake pigments, vapor-deposited aluminum flake pigments, colored aluminum flake pigments, metal oxide-coated mica pigments, and metal oxide-coated alumina flake pigments is preferably used as the bright pigment ($B_{P3}$).

From the perspectives of brightness and smoothness of the multi-layer coating film that is formed, the content proportions of the binder component ($A_{P3}$) and the bright pigment ($B_{P3}$) in the third water-based colored paint (P3) is such that based on 100 parts by mass of the solid content of the binder component ($A_{P3}$), the content of the bright pigment (BP3) is preferably in a range of from 3 to 500 parts by mass, more preferably in a range of from 20 to 300 parts by mass, and particularly preferably in a range of from 25 to 250 parts by mass.

Also, from the perspectives of brightness and smoothness of the multi-layer coating film that is formed, the content proportion of the bright pigment ($B_{P3}$) in the third water-based colored paint (P3) is, based on the paint solid content in the third water-based colored paint (P3), preferably in a range of from 3 to 80 mass %, more preferably in a range of from 15 to 75 parts by mass, and particularly preferably in a range of from 20 to 70 parts by mass.

Various additives such as a curing catalyst, a defoaming agent, an antioxidant, a UV absorber, a light stabilizer, a thickener, a surface conditioner, and a pigment dispersing agent, and pigments besides the bright pigment (BP3), such as a color pigment and an extender pigment, can be blended, as appropriate and as necessary into the third water-based colored paint (P3).

The third water-based colored paint (P3) can be prepared by dissolving or dispersing the aforementioned components in water or a medium (aqueous medium) containing water as a main component. Also, in the third water-based colored paint (P3), the paint solid content concentration ($NV_{P3}$) is in a range of from 2 to 17 mass %. An effect of obtaining a multi-layer coating film with excellent brightness and smoothness can be obtained by adjusting the paint solid content concentration ($NV_{P3}$) to within this range. From the perspectives of the brightness and smoothness of the multi-layer coating film that is formed, the paint solid content concentration ($NV_{P3}$) is preferably in a range of from 3 to 16 mass %, more preferably in a range of from 4 to 15 mass %, and particularly preferably in a range of from 5 to 14 mass %.

As necessary, the third water-based colored paint (P3) can be applied using a known coating method, such as electrostatic coating, air spraying, or air-less spraying.

The film thickness of the third colored coating film formed from the third water-based colored paint (P3) is, in terms of a cured film thickness ($T_{P3}$), in a range of from 0.5 to 7 μm, preferably in a range of from 0.7 to 5 μm, and more preferably in a range of from 0.9 to 4 μm. By adjusting the film thickness of the third colored coating film formed from the third water-based paint (P3) to within this certain range, a multi-layer coating film having excellent smoothness and brightness can be formed along with the first colored coating film and the second coating film.

The third colored coating film is left uncured and supplied to the formation of a clear coating film in the next step (5). Further, in a step (6) described below, the second coating film, the third colored coating film and the clear coating film formed in steps (3) to (5) are heated and cured together. Also, if necessary, before forming the clear coating film in the next step (5), the third colored coating film may be directly or indirectly heated through a method such as preheating or air blowing at a temperature of from approximately 40 to approximately 110° C., preferably from approximately 50 to approximately 90° C., and even more preferably from approximately 60 to approximately 80° C. for around 30 seconds to 60 minutes and preferably around 1 to 10 minutes. Of these, from perspectives such as the smoothness and brightness of the multi-layer coating film that is formed, preheating is preferably implemented between step (4) and step (5). The preheating can ordinarily be implemented by directly or indirectly heating, in a drying furnace, the object coated with the first colored paint (P1), the second water-based paint (P2), and the third water-based colored paint (P3), at a temperature of from 40 to 100° C., preferably from 50 to 90° C., and more preferably from 60 to 80° C. for 30 seconds to 20 minutes, preferably 1 to 15 minutes, and more preferably 2 to 10 minutes.

[Formation of Clear Coating Film]

In the present invention, a clear coat paint (P4) is applied onto the uncured third colored coating film formed in step (4), and thereby a clear coating film is formed (step (5)).

As the clear coat paint (P4), for example, a known clear coat paint ordinarily used to paint a vehicle body can be used, and specific examples include organic solvent-based thermosetting paints, water-based thermosetting paints, and thermosetting powdered paints, containing, as vehicle components, a base resin having a crosslinkable functional group such as a hydroxyl group, a carboxyl group, an epoxy group, or a silanol group, and a curing agent. Examples of the base resin include an acrylic resin, a polyester resin, an alkyd resin, a urethane resin, an epoxy resin, and a fluororesin, and examples of the curing agent include melamine resin, urea resin, a polyisocyanate compound that may be blocked, a carboxyl group-containing compound or resin, and an epoxy group-containing compound or resin. Among these, an organic solvent-based thermosetting paint containing a carboxyl group-containing resin and an epoxy group-containing resin, or a thermosetting paint containing a hydroxyl group-containing acrylic resin and a polyisocyanate compound that may be blocked is suitable. The clear coat paint may be an one-component paint or a two-component paint, such as a two-component urethane resin paint.

Furthermore, the clear coat paint (P4) described above may contain, as necessary in a range in which the transparency is not inhibited, a color pigment, a bright pigment, a dye, a matting agent, or the like, and may further include, as appropriate, an extender pigment, a UV absorber, a light stabilizer, a defoaming agent, a thickener, a rust inhibitor, a surface conditioner, and the like.

The clear coat paint (P4) can be applied by a method known per se, such as by air-less spraying, air spraying, and using a rotary atomizing coater, and electrostatic application may be implemented during coating.

The clear coat paint (P4) can be applied such that the film thickness thereof is typically in a range of from 10 to 80 μm, preferably from 15 to 60 μm, and more preferably from 20 to 50 μm, based on the cured film thickness. Also, from perspectives such as preventing the occurrence of coating film defects, after the clear coat paint (P4) has been applied, as necessary, the clear coat paint (P4) may be left at room temperature for an approximate interval of from 1 to 60 minutes, or the clear coat paint (P4) may be preheated at a temperature of from approximately 40 to approximately 80° C. for around 1 to 60 minutes.

[Heating and Curing of Coating Film]

In step (6), the multi-layer coating film including the first colored coating film, the second coating film, the third colored coating film, and the clear coating film formed in steps (2) to (5) are heated to thereby cure, all at once, the multi-layer coating film containing these four coating films. The heating can be implemented, for example, by a means such as hot air heating, infrared heating, and high frequency heating. The heating temperature is preferably from 60 to 160° C., more preferably from 80 to 150° C., and particularly preferably from 100 to 140° C. Furthermore, the heating time is preferably from 10 to 60 minutes, and more preferably from 15 to 40 minutes.

[Formed Multi-Layer Coating Film]

The multi-layer coating film that is formed by the steps described above has a layered structure including the four layers of the first colored coating film formed on a cured electrodeposited coating film, the second coating film, the third colored coating film, and the clear coating film. The method of the present invention employs a method of simultaneously curing the four layers of the first colored coating film, the second coating film, the third colored coating film, and the clear coating film, and by using the second water-based paint (P2) and the third colored water-based paint (P3) having specific compositions and properties to form the second coating film and the third colored coating film having specific properties, film thicknesses, and the like, a multi-layer coating film having excellent brightness and smoothness can be formed.

The reason for being able to form, through the present invention, a multi-layer coating film having excellent brightness and smoothness is not necessarily obvious, but the following is inferred as one of the reasons thereof. That is, it is inferred that by using, as the second water-based paint (P2), a paint having a viscosity ($V2_{P2}$) one minute after application within a specific range and having a relatively small percentage of increase in the viscosity ($V2_{P2}$) one minute after application in relation to the viscosity ($V1_{P2}$) of the paint, when the second water-based paint (P2) is applied onto the uncured first colored coating film, an uncured second coating film having flowability and suppressed dripping is formed, and even if the water in the uncured second coating film is moved into the uncured first colored coating film, the range of increase in viscosity of the uncured second coating film is relatively small, and therefore the flowability of the second coating film is relatively maintained, and as a result, a second coating film having excellent smoothness is formed. Furthermore, it is inferred that the third water-based colored paint (P3) containing the bright pigment ($B_{P3}$) and having a relatively low paint solid content concentration ($NV_{P3}$) is applied onto the second coating film having excellent smoothness, and in the drying process, the bright pigment ($B_{P3}$) in the third water-based colored paint (P3) is oriented in parallel on the second coating film having excellent smoothness, and as a result, a third colored coating film having excellent brightness and smoothness is formed.

EXAMPLES

The present invention will be described more specifically below through production examples, examples and comparative examples. However, the present invention is not limited by these examples only. In each example, "parts" and "%" are based on mass unless otherwise specified. Also, the film thickness of the coating film is based on the cured film thickness.

Production of First Colored Paint (P1)

Production Example 1: Production of Hydroxyl Group-Containing Polyester Resin A reaction vessel equipped with a thermometer, a thermostat, a stirring device, a reflux condenser, and a water separator was charged with 174 parts of trimethylolpropane, 327 parts of neopentyl glycol, 352 parts of adipic acid, 109 parts of isophthalic acid, and 101 parts of 1,2-cyclohexane dicarboxylic anhydride, and the temperature was raised from 160° C. to 230° C. over 3 hours. Then, while produced condensed water was distilled off with the water separator, the temperature was maintained at 230° C., and the mixture was reacted until the acid value reached 3 mg KOH/g or less. To this reaction product, 59 parts of trimellitic anhydride were added, the mixture was subjected to an addition reaction at 170° C. for 30 minutes, after which the mixture was cooled to 50° C. or lower, and 2-(dimethylamino) ethanol was added in an amount equivalent to the acid groups to neutralize the mixture. Then, deionized water was gradually added, and a hydroxyl group-containing polyester resin (PE-1) solution having a solid content concentration of 45% and a pH of 7.2 was obtained. The resulting hydroxyl group-containing polyester resin had an acid value of 35 mg KOH/g, a hydroxyl value of 128 mg KOH/g, and a weight average molecular weight of 13000.

Production Example 2: Production of Hydroxyl Group-Containing Acrylic Resin

A reaction vessel equipped with a thermometer, a thermostat, a stirring device, a reflux condenser, a nitrogen inlet tube, and a dripping device was charged with 35 parts of propylene glycol monopropyl ether, and the temperature was raised to 85° C. Subsequently, a mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise over 4 hours, and after completion of the dropwise addition, the mixture was aged for 1 hour. A mixture of 10 parts of propylene glycol monopropyl ether and 1 part of 2,2'-azobis(2,4-dimethylvaleronitrile) was then further added dropwise over 1 hour, and after completion of the dropwise addition, the mixture was aged for 1 hour. Then, 7.4 parts of diethanolamine and 13 parts of propylene glycol monopropyl ether were added, and a hydroxyl group-containing acrylic resin solution (AC-1) having a solid content of 55% was obtained. The resulting hydroxyl group-containing acrylic resin had an acid value of 47 mg KOH/g and a hydroxyl value of 72 mg KOH/g.

Production Example 3: Production of Titanium Dioxide Pigment Dispersion 56 parts (25 parts in terms of resin solid content) of the hydroxyl group-containing polyester resin solution (PE-1) obtained in Production Example 1, 90 parts of "JR-806" (trade name, available from Tayca Co., Ltd., rutile titanium dioxide), and 5 parts of deionized water were inserted into a stirring and mixing vessel, 2-(dimethylamino) ethanol was further added, and the pH was adjusted to 8.0. The resulting mixed solution was then inserted into a wide-mouth glass bottle, glass beads with a diameter of about 1.3 mmφ were inserted as a dispersion media, and the wide-mouth glass bottle was sealed. The contents were dispersed with a paint shaker for 30 minutes, and a titanium dioxide pigment dispersion (X-1) was obtained.

Production Example 4: Production of Black Pigment Dispersion 18 parts (10 parts in terms of resin solid content) of the hydroxyl group-containing acrylic resin solution (AC-1) obtained in Production Example 2, 10 parts of "Carbon MA-100" (trade name, available from Mitsubishi Chemical Corporation, carbon black pigment), and 60 parts of deionized water were mixed, the pH was adjusted to 8.2 using 2-(dimethylamino) ethanol, after which the mixture was dispersed with a paint shaker for 30 minutes, and a black pigment dispersion (X-2) was obtained.

Production Example 5: Production of Extender Pigment Dispersion 18 parts (10 parts in terms of resin solid content) of the hydroxyl group-containing acrylic resin solution (AC-1) obtained in Production Example 2, 25 parts of "Barifine BF-20" (trade name, available from Sakai Chemical Industry Co., Ltd., barium sulfate pigment), 0.6 parts (0.3 parts in terms of solid content) of "Surfynol 104A" (trade name, available from Evonik Industries AG, defoaming agent, solid content of 50%), and 36 parts of deionized water were mixed and dispersed with a paint shaker for one minute, and an extender pigment dispersion (X-3) was obtained.

Production Example 6: Production of Water-Based First Colored Paint 35.3 parts (24.7 parts in terms of resin solid content) of the hydroxyl group-containing polyester resin solution (PE-1) obtained in Production Example 1, 2.5 parts (1.4 parts in terms of resin solid content) of the hydroxyl group-containing acrylic resin solution (AC-1) obtained in Production Example 2, 42.9 parts (15 parts in terms of resin solid content) of "Ucoat UX-8100" (trade name, available from Sanyo Chemical Industries, Ltd., urethane emulsion, solid content of 35%), 37.5 parts (30 parts in terms of resin solid content) of "Cymel 325" (trade name, available from Allnex GmbH, melamine resin, solid content of 80%), 26.3 parts (10 parts in terms of resin solid content) of "Bayhydur VP LS 2310" (trade name, available from Sumika Covestro Urethane Co., Ltd., blocked polyisocyanate compound, solid content of 38%), 16.7 parts (10 parts of titanium dioxide pigment, 2.8 parts in solid content of the hydroxyl group-containing polyester resin (PE-1)) of the titanium dioxide pigment dispersion (X-1) obtained in Production Example 3, 15 parts (1.7 parts of carbon black pigment, 1.7 parts of solid content of the hydroxyl group-containing acrylic resin (AC-1)) of the black pigment dispersion (X-2) obtained in Production Example 4, and 115 parts (36 parts of barium sulfate pigment, 14.4 parts of solid content of the hydroxyl group-containing acrylic resin (AC-1)) of the extender pigment dispersion (X-3) obtained in Production Example 5 were homogeneously mixed. "Primal ASE-60" (trade name, available from The Dow Chemical Company, thickener), 2-(dimethylamino) ethanol and deionized water were added to the obtained mixture, and a water-based first colored paint (P1-1) was obtained with a pH of 8.0, a paint solid content concentration (NVP1) of 48%, and a viscosity of 1300 mPa·sec as measured using a Brookfield viscometer (type B viscometer) under measurement conditions including a temperature of 20° C. and a rotational speed of 6 revolutions per minute (6 rpm). The "LVDV-I" (trade name, available from Brookfield Engineering Co., Ltd.) was used as the Brookfield viscometer (type B viscometer).

Production Example 7: Production of Hydroxyl Group-Containing Acrylic Resin

A reaction vessel equipped with a thermometer, a thermostat, a stirring device, a reflux condenser, a nitrogen gas inlet tube, and a dripping device was charged with 128 parts of deionized water and 3 parts of "Adeka Reasoap SR-1025" (trade name, available from Adeka Corporation, an emulsifier, active ingredient 25%), the contents were mixed by stirring in a nitrogen stream, and the temperature was raised to 80° C.

Next, an amount of 1% of the total amount of a monomer emulsion for a core portion described below and 5.3 parts of a 6% ammonium persulfate aqueous solution were introduced into the reaction vessel, and the reaction vessel was maintained at 80° C. for 15 minutes. Subsequently, the remaining portion of the emulsion for the core portion was added dropwise over 3 hours into the reaction vessel maintained at the same temperature, and after completion of the dropwise addition, the mixture was aged for 1 hour. A monomer emulsion for a shell portion described below was then added dropwise over 1 hour, and the mixture was aged for 1 hour, after which the mixture was cooled to 30° C. while 40 parts of a 5% 2-(dimethylamino) ethanol aqueous solution was gradually added to the reaction vessel. The mixture was discharged while being filtered with a 100-mesh nylon cloth, and an aqueous dispersion of a water-dispersible hydroxyl group-containing acrylic resin (AC-2) having an average particle size of 100 nm and a solid content of 30% was obtained. The resulting water-dispersible hydroxyl group-containing acrylic resin (AC-2) had an acid value of 22 mg KOH/g and a hydroxyl value of 9 mg KOH/g. Furthermore, the water-dispersible hydroxyl group-containing acrylic resin (AC-2) corresponds to the water-dispersible hydroxyl group-containing acrylic resin (A') having the core/shell multi-layer structure.

Monomer emulsion for core portion: The monomer emulsion for the core portion was obtained by mixing and stirring 40 parts of deionized water, 2.8 parts of the "Adeka Reasoap SR-1025", 2 parts of ethylene glycol dimethacrylate, 1 part of allyl methacrylate, 10 parts of n-butyl acrylate, 52 parts of methyl methacrylate, and 12 parts of ethyl acrylate.

Monomer emulsion for shell portion: The monomer emulsion for the shell portion was obtained by mixing and stirring 17 parts of deionized water, 1.2 parts of "Adeka Reasoap SR-1025", 0.03 parts of ammonium persulfate, 3 parts of styrene, 11 parts of n-butyl acrylate, 2 parts of 2-hydroxyethyl methacrylate, 3.3 parts of methacrylic acid, 2.7 parts of methyl methacrylate, and 1 part of ethyl acrylate.

Production Example 8: Production of Hydroxyl Group-Containing Acrylic Resin

A reaction vessel equipped with a thermometer, a thermostat, a stirring device, a reflux condenser, a nitrogen gas inlet tube, and a dripping device was charged with 128 parts of deionized water and 3 parts of "Adeka Reasoap SR-1025" (trade name, available from Adeka Corporation, an emulsifier, active ingredient 25%), the contents were mixed by stirring in a nitrogen stream, and the temperature was raised to 80° C.

Next, an amount of 1% of the total amount of a monomer emulsion for a core portion described below and 5.3 parts of a 6% ammonium persulfate aqueous solution were introduced into the reaction vessel, and the reaction vessel was maintained at 80° C. for 15 minutes. Subsequently, the remaining portion of the emulsion for the core portion was added dropwise over 3 hours into the reaction vessel maintained at the same temperature, and after completion of the dropwise addition, the mixture was aged for 1 hour. A monomer emulsion for a shell portion described below was then added dropwise over 1 hour, and the mixture was aged for 1 hour, after which the mixture was cooled to 30° C. while 40 parts of a 5% 2-(dimethylamino) ethanol aqueous solution was gradually added to the reaction vessel. The mixture was discharged while being filtered with a 100-mesh nylon cloth, and an aqueous dispersion of a water-dispersible hydroxyl group-containing acrylic resin (AC-3) having an average particle size of 95 nm and a solid content of 30% was obtained. The resulting water-dispersible hydroxyl group-containing acrylic resin had an acid value of 33 mg KOH/g and a hydroxyl value of 25 mg KOH/g. Furthermore, the water-dispersible hydroxyl group-containing acrylic resin (AC-3) corresponds to the water-dispersible hydroxyl group-containing acrylic resin (A).

Monomer emulsion for core portion: The monomer emulsion for the core portion was obtained by mixing and stirring 40 parts of deionized water, 2.8 parts of "Adeka Reasoap SR-1025", 2.1 parts of methylene bisacrylamide, 2.8 parts of styrene, 16.1 parts of methyl methacrylate, 28 parts of ethyl acrylate, and 21 parts of n-butyl acrylate.

Monomer emulsion for shell portion: The monomer emulsion for the shell portion was obtained by mixing and stirring 17 parts of deionized water, 1.2 parts of "Adeka Reasoap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate.

The content proportions of each polymerizable unsaturated monomer of the water-dispersible hydroxyl group-containing acrylic resins (AC-2) and (AC-3) are indicated in Table 1 below.

TABLE 1

Table 1

| | Production Example | |
|---|---|---|
| | 7 | 8 |
| Name of water-dispersible hydroxyl group-containing acrylic resin (A) | AC-2 | AC-3 |
| Deionized water | 128 | 128 |

TABLE 1-continued

Table 1

| | | | | Production Example | |
|---|---|---|---|---|---|
| | | | | 7 | 8 |
| "Adeka Reasoap SR-1025" | | | | 3 | 3 |
| 6% ammonium persulfate aqueous solution | | | | 5.3 | 5.3 |
| Monomer emulsion for core portion | Deionized water | | | 40 | 40 |
| | "Adeka Reasoap SR-1025" | | | 2.8 | 2.8 |
| | Polymerizable unsaturated monomer (c) having at least two polymerizable unsaturated groups per molecule | | Ethylene glycol dimethacrylate | 2 | |
| | | | Allyl methacrylate | 1 | |
| | | | Methylene bisacrylamide | | 2.1 |
| | Polymerizable unsaturated monomer (d) having one polymerizable unsaturated group per molecule | Polymerizable unsaturated monomer (h) having one polymerizable unsaturated group per molecule and having an alkyl group of one or two carbons | Methyl methacrylate | 52 | 16.1 |
| | | | Ethyl acrylate | 12 | 28 |
| | | | n-butyl acrylate | 10 | 21 |
| | | | Styrene | | 2.8 |
| Monomer emulsion for shell portion | Deionized water | | | 17 | 17 |
| | "Adeka Reasoap SR-1025" | | | 1.2 | 1.2 |
| | Ammonium persulfate | | | 0.03 | 0.03 |
| | Hydroxyl group-containing polymerizable unsaturated monomer (a) | | 2-hydroxyethyl methacrylate | 2 | |
| | | | 2-hydroxyethyl acrylate | | 5.1 |
| | Polymerizable unsaturated monomer (e) having a $C_{4-22}$ hydrocarbon group | | n-butyl acrylate | 11 | 9 |
| | Polymerizable unsaturated monomer (f) other than monomers (a) and (e) | Carboxyl group-containing polymerizable unsaturated monomer (g) | Methacrylic acid | 3.3 | 5.1 |
| | | Styrene | | 3 | 3 |
| | | Methyl methacrylate | | 2.7 | 6 |
| | | Ethyl acrylate | | 1 | 1.8 |
| Average particle size [nm] | | | | 100 | 95 |
| Solid content [mass %] | | | | 30 | 30 |
| Acid value [mg KOH/g] | | | | 22 | 33 |
| Hydroxyl value [mg KOH/g] | | | | 9 | 25 |
| Content proportion [mass %] of each monomer for core portion based on total mass of monomer (c) and monomer (d) | | Polymerizable unsaturated monomer (c) having at least two polymerizable unsaturated groups per molecule | | 3.9 | 3.0 |
| | | Polymerizable unsaturated monomer (d) having one polymerizable unsaturated group per molecule | | 96.1 | 97.0 |
| | | Polymerizable unsaturated monomer (h) having one polymerizable unsaturated group per molecule and having an alkyl group of one or two carbons | | 83.1 | 63.0 |
| Content proportion [mass %] of each monomer for core portion based on total mass of monomers (a), (e) and (f) | | Hydroxyl group-containing polymerizable unsaturated monomer (a) | | 8.7 | 17.0 |
| | | Polymerizable unsaturated monomer (e) having hydrocarbon group of 4 to 22 carbons | | 47.8 | 30.0 |
| | | Polymerizable unsaturated monomer (f) other than monomers (a) and (e) | | 43.5 | 53.0 |
| | | Carboxyl group-containing polymerizable unsaturated monomer (g) | | 14.3 | 17.0 |

Production Example 9: Production of Acrylic Resin Having Hydroxyl Group and Phosphate Group A reaction vessel equipped with a thermometer, a thermostat, a stirrer, a reflux condenser, a nitrogen gas inlet tube, and a dripping device was charged with a mixed solvent of 27.5 parts of methoxypropanol and 27.5 parts of isobutanol and heated to 110° C. Next, 121.5 parts of a mixture were added over 4 hours to the mixed solvent, the mixture including 25 parts of styrene, 27.5 parts of n-butyl methacrylate, 20 parts of "isostearyl acrylate" (trade name, available from Osaka Organic Chemical Ind. Ltd., branched higher alkyl acrylate), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of tert-butylperoxy octanoate. A mixture of 0.5 parts of tert-butylperoxy octanoate and 20 parts of isopropanol was then added dropwise over one hour. Subsequently, the resulting mixture was stirred and aged for one hour, and a solution of an acrylic resin (AC-4) having a hydroxyl group and a phosphate group, which had a solid content concentration of 50%, was obtained. The acid value due to the phosphate group of the resin was 83 mg KOH/g, the hydroxyl value was 29 mg KOH/g, and the weight average molecular weight was 10000.

Phosphate group-containing polymerizable monomer: A reaction vessel equipped with a thermometer, a thermostat, a stirrer, a reflux condenser, a nitrogen gas inlet tube, and a dripping device was charged with 57.5 parts of monobutyl phosphate and 41 parts of isobutanol and heated to 90° C., after which 42.5 parts of glycidyl methacrylate were added dropwise for over 2 hours, and the mixture was further stirred and aged for 1 hour. Subsequently, 59 parts of isopropanol were added, and a phosphate group-containing polymerizable monomer solution having a solid content concentration of 50% was obtained. The acid value of the obtained monomer was 285 mg KOH/g.

Production Example 10: Production of Hydroxyl Group-Containing Polyester Resin A reaction vessel equipped with a thermometer, a thermostat, a stirring device, a reflux condenser, a nitrogen gas inlet tube, and a water separator was charged with 109 parts of trimethylolpropane, 141 parts of 1,6-hexanediol, 126 parts of 1,2-cyclohexane dicarboxylic anhydride, and 120 parts of adipic acid. The temperature was raised from 160° C. to 230° C. over 3 hours, and then a condensation reaction was implemented at 230° C. for 4 hours. Next, to introduce carboxyl groups into the resulting condensation reaction product, 38.3 parts of trimellitic anhydride were added and reacted at 170° C. for 30 minutes, after which the mixture was diluted with 2-ethyl-1-hexanol, and a hydroxyl group-containing polyester resin solution (PE-2) having a solid content of 70% was obtained. The resulting hydroxyl group-containing polyester resin had an acid value of 46 mg KOH/g, a hydroxyl value of 150 mg KOH/g, and a number average molecular weight of 1400. In the raw material composition, the total content of the alicyclic polybasic acid in the acid component was 46 mol % based on the total amount of the acid component.

Production Example 11: Macromonomer Production

A reaction vessel equipped with a thermometer, a thermostat, a stirring device, a reflux condenser, a nitrogen gas inlet tube, and a dripping device was charged with 16 parts of ethylene glycol monobutyl ether and 3.5 parts of 2,4-diphenyl-4-methyl-1-pentene (which may be abbreviated as "MSD" hereinafter), nitrogen gas was then introduced into the gas phase, and the temperature was increased to 160° C. while stirring. Once the temperature reached 160° C., a mixed solution consisting of 30 parts of n-butyl methacrylate, 40 parts of 2-ethylhexyl methacrylate, 30 parts of 2-hydroxyethyl methacrylate, and 7 parts of di-tert-amyl peroxide was added dropwise over 3 hours, after which the mixed solution was stirred at the same temperature for 2 hours. The mixture was then cooled to 30° C. and diluted with ethylene glycol monobutyl ether, and a macromonomer solution (d1-1) having a solid content of 65% was obtained. The hydroxyl value of the obtained macromonomer was 125 mg KOH/g, and the number average molecular weight was 2300. Additionally, the obtained macromonomer was analyzed by proton NMR, and the result showed that 97% or more of the ethylenically unsaturated groups derived from the MSD were present at the polymer chain ends, and 2% of the groups thereof were eliminated.

Note that in the analysis by proton NMR described above, deuterated chloroform was used as a solvent, peaks (4.8 ppm, 5.1 ppm) based on protons of unsaturated groups of the MSD, peaks (5.0 ppm, 5.2 ppm) based on protons of ethylenically unsaturated groups at the macromonomer chain ends, and peaks (7.2 ppm) of aromatic protons derived from the MSD were measured before and after the polymerization reaction, after which on the basis of the assumption that the aromatic protons (7.2 ppm) derived from the MSD did not change before and after the polymerization reaction, each unsaturated group (unreacted group, group at macromonomer chain end, eliminated group) was quantitatively determined.

Production Example 12: Production of Acrylic Associative Thickener

A reaction vessel equipped with a thermometer, a thermostat, a stirring device, a reflux condenser, a nitrogen gas inlet tube, and two dripping devices was charged with 15.4 parts (10 parts in terms of solid content) of the macromonomer solution obtained in Production Example 11, 20 parts of ethylene glycol monobutyl ether, and 30 parts of diethylene glycol monoethyl ether acetate, and the temperature was raised to 85° C. while introducing nitrogen gas into the liquid. Next, with the reaction vessel maintained at the same temperature, a mixed solution consisting of 31.5 parts of N,N-dimethylacrylamide, 31.5 parts of N-isopropyl acrylamide, 27 parts of 2-hydroxyethyl acrylate, 10 parts of ethylene glycol monobutyl ether, and 40 parts of diethylene glycol monoethyl ether acetate, and a mixed solution consisting of 0.15 parts of "Perbutyl O" (trade name, available from NOF Corporation, polymerization initiator, tert-butylperoxy-2-ethylhexanoate) and 20 parts of ethylene glycol monobutyl ether were simultaneously added dropwise into the reaction vessel over 4 hours, and after dropwise addition was completed, the mixture was stirred and aged for 2 hours at the same temperature. Next, with the reaction vessel maintained at the same temperature, a mixed solution consisting of 0.3 parts of 2,2'-azobis(2,4-dimethylvaleronitrile) and 15 parts of ethylene glycol monobutyl ether was added dropwise over one hour into the reaction vessel, and after dropwise addition was completed, the mixture was stirred and aged at the same temperature for 1 hour. Next, the mixture was cooled to 30° C. while adding ethylene glycol monobutyl ether, and a copolymer solution having a solid content of 35% was obtained. The weight average molecular weight of the obtained copolymer was 310000. An amount of 215 parts of deionized water was added to the obtained copolymer solution, and an acrylic associative thickener diluted solution (RC-1) having a solid content of 20% was obtained.

Production Example 13: Production of Black Pigment Dispersion 18 parts (10 parts in terms of resin solid content) of the hydroxyl group-containing acrylic resin solution (AC-1) obtained in Production Example 2, 10 parts of "Raven 5000 Ultra III Powder" (trade name, available from Birla Carbon, carbon black pigment), and 60 parts of deionized water were mixed, the pH was adjusted to 8.2 using 2-(dimethylamino) ethanol, after which the mixture was dispersed with a paint shaker for 30 minutes, and a black pigment dispersion (X-4) was obtained.

Production Example 14: Production of Yellow Pigment Dispersion 18 parts (10 parts in terms of resin solid content) of the hydroxyl group-containing acrylic resin solution (AC-1) obtained in Production Example 2, 10 parts of "Daipyroxide™ Yellow 8170" (trade name, available from Dainichiseika Color & Chem MFG Co., Ltd., yellow iron oxide pigment), and 60 parts of deionized water were mixed, the pH was adjusted to 8.2 using 2-(dimethylamino) ethanol, after which the mixture was dispersed with a paint shaker for 30 minutes, and a yellow pigment dispersion (X-5) was obtained.

Production Example 15: Production of Bright Pigment Dispersion

In a stirring and mixing vessel, 5.8 parts of "Xiralic T60-10 SW Crystal Silver" (trade name, available from Merck & Co., metal oxide-coated alumina flake pigment), 35 parts of 2-ethyl-1-hexanol, and 3.48 parts (1.74 parts in terms of solid content) of the solution of the acrylic resin (AC-4) having a hydroxyl group and a phosphate group and obtained in Production Example 9 were homogeneously mixed, and a bright pigment dispersion (X-6) was obtained.

Production Example 16: Production of Bright Pigment Dispersion

In a stirring and mixing vessel, 5.5 parts (4.2 parts in terms of solid content) of "Aluminum Paste GX-3108" (trade name, available from Asahi Kasei Metals Corporation, an aluminum pigment paste, aluminum content of 77%), 2.4 parts (1.8 parts in terms of solid content) of "Aluminum Paste GX-3100" (trade name, available from Asahi Kasei Metals Corporation, an aluminum pigment paste, aluminum content of 74%), 35 parts of 2-ethyl-1-hexanol, 3.6 parts (1.8 parts in terms of solid content) of the solution of the acrylic resin (AC-4) having a hydroxyl group and a phosphate group and obtained in Production Example 9, and 0.2 parts of 2-(dimethylamino) ethanol were homogeneously mixed, and a bright pigment dispersion (X-7) was obtained.

Production Example 17: Production of Second Water-Based Paint (P2)

A stirring and mixing vessel was charged with 100 parts (30 parts in terms of solid content) of the water-dispersible hydroxyl group-containing acrylic resin aqueous dispersion (AC-2) obtained in Production Example 7, 2.8 parts (1.6 parts in terms of solid content) of the hydroxyl group-containing acrylic resin solution (AC-1) obtained in Production Example 2, 35.7 parts (25 parts in terms of solid content) of the hydroxyl group-containing polyester resin solution (PE-2) obtained in Production Example 10, 44.3 parts of the bright pigment dispersion (X-6) obtained in Production Example 15, 37.5 parts (30 parts in terms of solid content) of "Cymel 325" (trade name, available from Allnex GmbH, melamine resin, solid content of 80%), 32.6 parts (3.7 parts of carbon black pigment, 3.7 parts of solid content of hydroxyl group-containing acrylic resin (AC-1)) of the black pigment dispersion (X-4) obtained in Production Example 13, and 63.8 parts (20 parts of barium sulfate pigment, 8 parts of solid content of the hydroxyl group-containing acrylic resin (AC-1)) of the extender pigment dispersion (X-3) obtained in Production Example 5. The contents were homogeneously mixed, after which 8.5 parts (1.7 parts in terms of solid content) of the acrylic associative thickener diluted solution obtained in Production Example 12, 2-(dimethylamino) ethanol and deionized water were further added, and a second water-based paint (P2-1) having a pH of 8.0 and a paint solid content concentration (NVP2) of 23% was obtained.

The viscosity (V1P2) of the obtained second water-based paint (P2-1) measured under conditions including a shear rate of 0.1 sec-1 and a temperature of 23° C. was 135 Pa·sec. The viscosity (V1P2) was measured using, as a viscoelasticity measuring device, the HAAKE RheoStress RS150 (trade name, available from HAAKE), and was the viscosity (V1P2) measured at a shear rate of 0.1 sec-1 when the shear rate was varied from 10000 sec-1 to 0.0001 sec-1 at a temperature of 23° C.

Additionally, the viscosity (V2P2) of the second water-based paint (P2-1) one minute after application was 230 Pa sec. The viscosity (V2P2) one minute after application was obtained as follows. The second water-based paint (P2-1) was applied once onto a tin plate having a length of 45 cm, a width of 30 cm, and a thickness of 0.8 mm using the "ABB Cartridge Bell Coater" (trade name, available from ABB Ltd.), which is a rotary atomizing-type bell coater, under conditions including a bell diameter of 77 mm, a bell rotational speed of 25000 rpm, a shaping air flow rate of 700 NL/min, an applied voltage of −60 kV, a temperature of 23° C. and a humidity of 75%, so that the dried film thickness was 12 μm. Next, one minute after the second water-based paint (P2-1) was applied onto the tin plate, a portion of the coating film was scraped off and sampled using a spatula. The viscoelasticity measuring device "HAAKE RheoStress RS150" (trade name, available from HAAKE) was then used to measure the viscosity at a shear rate of 0.1 sec-1 when the shear rate was varied from 10000 sec-1 to 0.0001 sec-1 at a temperature of 23° C. The obtained viscosity was used as the viscosity (V2P2).

Further, a ratio (V2P2)/(V1P2) of the viscosity (V2P2) of the second water-based paint (P2-1) one minute after application to the viscosity (V1P2) was 1.7/1.

Production Examples 18 to 38

Second water-based paints (P2-2) to (P2-22) having a pH of 8.0 were obtained in the same manner as Production Example 17 with the exception that the formulation composition and paint solid content concentration (NVP2) of Production Example 17 were changed as indicated in Table 2 below. The viscosity (V1P2) of the obtained second water-based paint, the viscosity (V2P2) one minute after application, and the ratio (V2P2)/(V1P2) of the viscosity (V2P2) one minute after application to the viscosity (V1P2) are also indicated in Table 2 below.

TABLE 2

Table 2

| | | | Production Example | | | | | | | |
|---|---|---|---|---|---|---|---|---|---|---|
| | | | 17 | 18 | 19 | 20 | 21 | 22 | 23 | 24 |
| Name of second water-based paint (P2) | | | P2-1 | P2-2 | P2-3 | P2-4 | P2-5 | P2-6 | P2-7 | P2-8 |
| Water-dispersible hydroxyl group- | Water-dispersible hydroxyl group-containing acrylic resin (A') having a core/shell multi- | Water-dispersible hydroxyl group-containing acrylic resin (AC-2) | 100 | 100 | | 100 | 100 | 100 | 100 | 100 |

TABLE 2-continued

Table 2

| | | | Production Example | | | | | | | |
|---|---|---|---|---|---|---|---|---|---|---|
| | | | 17 | 18 | 19 | 20 | 21 | 22 | 23 | 24 |
| containing acrylic resin (A) | layer structure | aqueous dispersion | | | | | | | | |
| | | Water-dispersible hydroxyl group-containing acrylic resin (AC-3) aqueous dispersion | | | 100 | | | | | |
| Hydroxyl group-containing acrylic resin (AC-1) solution | | | 2.8 | 2.8 | 2.8 | 2.8 | 2.8 | 2.8 | 2.8 | 5.2 |
| Hydroxyl group-containing polyester resin (PE-2) solution | | | 35.7 | 35.7 | 35.7 | 35.7 | 35.7 | 35.7 | 35.7 | 35.7 |
| "Cymel 325" | | | 37.5 | 37.5 | 37.5 | 37.5 | 37.5 | 37.5 | 37.5 | 37.5 |
| Bright pigment dispersion (X-6) | | | 44.3 | 44.3 | 44.3 | 44.3 | 44.3 | 44.3 | 44.3 | |
| Bright pigment dispersion (X-7) | | | | | | | | | | 46.7 |
| Black pigment dispersion (X-4) | | | 32.6 | 32.6 | 32.6 | 32.6 | 32.6 | 32.6 | 32.6 | |
| Yellow pigment dispersion (X-5) | | | | | | | | | | 4.4 |
| Extender pigment dispersion (X-3) | | | 63.8 | 63.8 | 63.8 | 63.8 | 63.8 | 63.8 | 63.8 | 63.8 |
| 2-ethyl-1-hexanol | | | | | | | | | | |
| Thickener | Acrylic associative thickener diluted solution (RC-1) | | 8.5 | 7.5 | 7.5 | 6.5 | | | | 6.0 |
| | "Adeka NOL UH-756 VF" (Note 1) | | | | | | 0.9 | 0.6 | 0.2 | |
| | "Primal ASE-60" (Note 2) | | | | | | | | | |
| Paint solid content concentration ($NV_{P2}$) [mass %] | | | 23 | 25 | 25 | 27 | 23 | 25 | 27 | 25 |
| Paint viscosity ($V1_{P2}$) [Pa · sec] | | | 135 | 70 | 21 | 58 | 2.1 | 1.9 | 2.1 | 48 |
| Viscosity ($V2_{P2}$) [Pa · sec] of second water-based colored paint (P2) one minute after application | | | 230 | 246 | 73 | 205 | 3.5 | 3.4 | 10.1 | 182 |
| (Viscosity ($V2_{P2}$) one minute after application)/(paint viscosity ($V1_{P2}$)) | | | 1.7/1 | 3.5/1 | 3.5/1 | 3.5/1 | 1.7/1 | 1.8/1 | 4.8/1 | 3.8/1 |

TABLE 3

Table 2 (Continuation-1)

| | | | Production Example | | | | | | |
|---|---|---|---|---|---|---|---|---|---|
| | | | 25 | 26 | 27 | 28 | 29 | 30 | 31 |
| Name of second water-based paint (P2) | | | P2-9 | P2-10 | P2-11 | P2-12 | P2-13 | P2-14 | P2-15 |
| Water-dispersible hydroxyl group-containing acrylic resin (A) | Water-dispersible hydroxyl group-containing acrylic resin (A') having a core/shell multi-layer structure | Water-dispersible hydroxyl group-containing acrylic resin (AC-2) aqueous dispersion | 100 | 100 | 100 | 100 | 100 | 100 | 100 |
| | | Water-dispersible hydroxyl group-containing acrylic resin (AC-3) aqueous dispersion | | | | | | | |
| Hydroxyl group-containing acrylic resin (AC-1) solution | | | 5.2 | 5.2 | 5.2 | 5.2 | 5.2 | 5.2 | 7.0 |
| Hydroxyl group-containing polyester resin (PE-2) solution | | | 35.7 | 35.7 | 35.7 | 35.7 | 35.7 | 35.7 | 35.7 |
| "Cymel 325" | | | 37.5 | 37.5 | 37.5 | 37.5 | 37.5 | 37.5 | 37.5 |
| Bright pigment dispersion (X-6) | | | | | | | | | |
| Bright pigment dispersion (X-7) | | | 46.7 | 46.7 | 46.7 | 46.7 | 46.7 | 46.7 | |
| Black pigment dispersion (X-4) | | | | | | | | | |
| Yellow pigment dispersion (X-5) | | | 4.4 | 4.4 | 4.4 | 4.4 | 4.4 | 4.4 | |
| Extender pigment dispersion (X-3) | | | 63.8 | 63.8 | 63.8 | 63.8 | 63.8 | 63.8 | 63.8 |
| 2-ethyl-1-hexanol | | | | | | | | | 35.0 |
| Thickener | Acrylic associative thickener diluted solution (RC-1) | | 5.0 | 4.0 | 7.0 | 8.0 | 4.0 | | 6.5 |
| | "Adeka NOL UH-756 VF" (Note 1) | | | | | | | 2.8 | |
| | "Primal ASE-60" (Note 2) | | | | | | | | |
| Paint solid content concentration ($NV_{P2}$) [mass %] | | | 25 | 25 | 25 | 21 | 27 | 25 | 25 |
| Paint viscosity ($V1_{P2}$) [Pa · sec] | | | 40 | 39 | 55 | 82 | 45 | 22 | 60 |
| Viscosity ($V2_{P2}$) [Pa · sec] of second water-based colored paint (P2) one minute after application | | | 154 | 142 | 195 | 254 | 156 | 100 | 196 |
| (Viscosity ($V2_{P2}$) one minute after application)/(paint viscosity ($V1_{P2}$)) | | | 3.9/1 | 3.6/1 | 3.5/1 | 3.1/1 | 3.5/1 | 4.5/1 | 3.3/1 |

TABLE 4

Table 2 (Continuation-2)

| | | | Production Example | | | | | | |
|---|---|---|---|---|---|---|---|---|---|
| | | | 32 | 33 | 34 | 35 | 36 | 37 | 38 |
| Name of second water-based paint (P2) | | | P2-16 | P2-17 | P2-18 | P2-19 | P2-20 | P2-21 | P2-22 |
| Water-dispersible hydroxyl group-containing acrylic resin (A) | Water-dispersible hydroxyl group-containing acrylic resin (A') having a core/shell multi-layer structure | Water-dispersible hydroxyl group-containing acrylic resin (AC-2) aqueous dispersion | 100 | 100 | 100 | 100 | 100 | 100 | 100 |
| | | Water-dispersible hydroxyl group-containing acrylic resin (AC-3) aqueous dispersion | | | | | | | |
| Hydroxyl group-containing acrylic resin (AC-1) solution | | | 7.0 | 2.8 | 2.8 | 2.8 | 2.8 | 2.8 | 2.8 |
| Hydroxyl group-containing polyester resin (PE-2) solution | | | 35.7 | 35.7 | 35.7 | 35.7 | 35.7 | 35.7 | 35.7 |
| "Cymel 325" | | | 37.5 | 37.5 | 37.5 | 37.5 | 37.5 | 37.5 | 37.5 |
| Bright pigment dispersion (X-6) | | | | 44.3 | 44.3 | 44.3 | 44.3 | 44.3 | |
| Bright pigment dispersion (X-7) | | | | | | | | | 46.7 |
| Black pigment dispersion (X-4) | | | | 32.6 | 32.6 | 32.6 | 32.6 | 32.6 | |
| Yellow pigment dispersion (X-5) | | | 4.4 | | | | | | 4.4 |
| Extender pigment dispersion (X-3) | | | 63.8 | 63.8 | 63.8 | 63.8 | 63.8 | 63.8 | 63.8 |
| 2-ethyl-1-hexanol | | | 35.0 | | | | | | |
| Thickener | Acrylic associative thickener diluted solution (RC-1) | | 6.5 | | | | 20.0 | | |
| | "Adeka NOL UH-756 VF" (Note 1) | | | | | | | | |
| | "Primal ASE-60" (Note 2) | | | 10.7 | 8.9 | 5.4 | | | 8.9 |
| Paint solid content concentration ($NV_{P2}$) [mass %] | | | 25 | 23 | 25 | 27 | 25 | 25 | 25 |
| Paint viscosity ($V1_{P2}$) [Pa · sec] | | | 59 | 18 | 14 | 14 | 153 | 1.9 | 55 |
| Viscosity ($V2_{P2}$) [Pa · sec] of second water-based colored paint (P2) one minute after application | | | 195 | 122 | 140 | 147 | 748 | 2.0 | 280 |
| (Viscosity ($V2_{P2}$) one minute after application)/(paint viscosity ($V1_{P2}$)) | | | 3.3/1 | 6.7/1 | 9.7/1 | 10.5/1 | 4.9/1 | 1.1/1 | 5.1/1 |

(Note 1) "Adeka NOL UH-756 VF": trade name, available from Adeka Corporation, urethane associative thickener, solid content of 32%.

(Note 2) "Primal ASE-60": trade name, available from The Dow Chemical Company, polyacrylic acid-based thickener, solid content of 28%.

Production Example 39: Production of Bright Pigment Dispersion

In a stirring and mixing vessel, 4.5 parts of "Xirallic T60-10 SW Crystal Silver" (trade name, available from Merck & Co., metal oxide-coated alumina flake pigment), 35 parts of 2-ethyl-1-hexanol, and 2.7 parts (1.35 parts in terms of solid content) of the solution of the acrylic resin (AC-4) having a hydroxyl group and a phosphate group and obtained in Production Example 9 were homogeneously mixed, and a bright pigment dispersion (X-8) was obtained.

Production Example 40: Production of Bright Pigment Dispersion

In a stirring and mixing vessel, 26.0 parts (20.0 parts in terms of solid content) of "Aluminum Paste GX-3108" (trade name, available from Asahi Kasei Metals Corporation, an aluminum pigment paste, aluminum content of 77%), 11.4 parts (8.0 parts in terms of solid content) of "Alpaste 6360NS" (trade name, available from Toyo Aluminum K.K., an aluminum pigment paste, aluminum content of 70%), 35 parts of 2-ethyl-1-hexanol, 16.8 parts (8.4 parts in terms of solid content) of the solution of the acrylic resin (AC-4) having a hydroxyl group and a phosphate group and obtained in Production Example 9, and 0.2 parts of 2-(dimethylamino) ethanol were homogeneously mixed, and a bright pigment dispersion (X-9) was obtained.

Production Example 41: Production of Third Water-Based Colored Paint (P3)

A stirring and mixing vessel was charged with 100 parts (30 parts in terms of solid content) of the water-dispersible hydroxyl group-containing acrylic resin aqueous dispersion (AC-2) obtained in Production Example 7, 25.9 parts (14.3 parts in terms of solid content) of the hydroxyl group-containing acrylic resin solution (AC-1) obtained in Production Example 2, 28.6 parts (20 parts in terms of solid content) of the hydroxyl group-containing polyester resin solution (PE-2) obtained in Production Example 10, 42.2 parts of the bright pigment dispersion (X-8) obtained in Production Example 39, 37.5 parts (30 parts in terms of solid content) of "Cymel 325" (trade name, available from Allnex GmbH, melamine resin, solid content of 80%), and 38.8 parts (4.4 parts of carbon black pigment, 4.4 parts of solid content of the hydroxyl group-containing acrylic resin (AC-1)) of the black pigment dispersion (X-4) obtained in Production Example 13. The contents were homogeneously mixed, after which 1.6 parts (0.5 parts in terms of solid content) of "Adeka NOL UH-756VF" (trade name, available from Adeka Corporation, urethane associative thickener, solid content of 32%), 1.8 parts (0.5 parts in terms of solid content) of "Primal ASE-60" (trade name, available from The Dow Chemical Company, polyacrylic acid-based thickener, solid content of 28%), 2-(dimethylamino) ethanol and deionized water were further added, and a third water-based colored paint (P3-1) having a pH of 8.0 and a paint solid content concentration (NVP3) of 12% was obtained.

Production Examples 42 and 43

Third water-based colored paints (P3-2) and (P3-3) having a pH of 8.0 were obtained in the same manner as Production Example 41 with the exception that the formulation composition and paint solid content concentration (NVP3) of Production Example 41 were changed as indicated in Table 3 below.

TABLE 5

Table 3

| | | Production Example | | |
|---|---|---|---|---|
| | | 41 | 42 | 43 |
| Name of third water-based colored paint (P3) | | P3-1 | P3-2 | P3-3 |
| Binder Component ($A_{P3}$) | Water-dispersible hydroxyl group-containing acrylic resin (AC-2) aqueous dispersion | 100 | 100 | 100 |
| | Hydroxyl group-containing acrylic resin (AC-1) solution | 25.9 | 21.1 | 21.1 |
| | Hydroxyl group-containing polyester resin (PE-2) solution | 28.6 | 28.6 | 28.6 |
| | "Cymel 325" | 37.5 | 37.5 | 37.5 |
| Bright pigment dispersion (X-8) | | 42.2 | | |
| Bright pigment dispersion (X-9) | | | 89.4 | 89.4 |
| Black pigment dispersion (X-4) | | 38.8 | | |
| Yellow pigment dispersion (X-5) | | | 25.6 | 25.6 |
| Thickener | "Adeka NOL UH-756 VF" (Note 1) | 1.6 | 3.1 | 4.7 |
| | "Primal ASE-60" (Note 2) | 1.8 | 3.6 | 5.4 |
| Paint solid content concentration ($NV_{P3}$) [mass %] | | 12 | 14 | 12 |
| Content proportion [parts by mass] of bright pigment ($B_{P3}$) based on 100 parts by mass of solid content of binder component ($A_{P3}$) | | 4.5 | 27 | 27 |
| Content proportion [mass %] of bright pigment ($B_{P3}$) based on paint solid content in third water-based colored paint (P3) | | 4.1 | 21 | 20 |

when cured was 12 μm, and the obtained product was left standing for one minute. Next, the third water-based colored paint (P3-1) obtained in Production Example 41 was electrostatically applied onto the uncured second coating film using the rotary atomizing-type electrostatic coater such that the film thickness when cured was 4 μm, the obtained product was left standing for 2 minutes and then preheated at 80° C. for 3 minutes. Next, "Magiclon KINO-1210 TW" (trade name, available from Kansai Paint Co., Ltd., an acrylic resin-based organic solvent-type clear coat paint containing a carboxyl group-containing resin and an epoxy group-containing resin, hereinafter, which may be referred to as a "clear coat paint (P4-1)") was electrostatically Preparation of Test Sheet Respective test sheets were prepared in the following manner using the first colored paint (P1-1) obtained in Production Example 6, the second water-based paints (P2-1) to (P2-22) obtained in Production Examples 17 to 38, the third water-based colored paints (P3-1) to (P3-3) obtained in Production Examples 41 to 43, and the following clear coat paint, and evaluation tests were conducted.

Preparation of Object to be Coated for Testing

A cationic electrodeposition paint (trade name: "Electron GT-10", available from Kansai Paint Co., Ltd.) was applied by electrodeposition onto a cold-rolled steel sheet chemically treated with zinc phosphate such that the cured film thickness was 20 μm, the coated steel sheet was heated at 170° C. for 30 minutes to cure the paint, and an object to be coated for testing was prepared.

Example 1

The water-based first colored paint (P1-1) obtained in Production Example 6 was electrostatically applied onto the object to be coated for testing using a rotary atomizing-type electrostatic coater such that the film thickness when cured was 20 μm, and the obtained product was then left standing for 3 minutes, and then preheated at 80° C. for 3 minutes. Next, the second water-based paint (P2-1) obtained in Production Example 17 was electrostatically applied onto the uncured first colored coating film using the rotary atomizing-type electrostatic coater such that the film thickness applied onto the uncured third colored coating film such that the film thickness when cured was 35 μm, the obtained product was left standing for 7 minutes and then preheated at 140° C. for 30 minutes to thereby simultaneously cure the first colored coating film, the second coating film, the third colored coating film, and the clear coating film, and a test sheet was thereby prepared.

Examples 2 to 19 and Comparative Examples 1 to 6

Test sheets were produced in the same manner as in Example 1 with the exception that the type and cured film thickness of the first water-based colored paint, the second water-based paint, the third water-based colored paint, and the clear coat paint used in Example 1 were changed as indicated in Table 4 below.

(Note 3) "KINO-6510 T": trade name, available from Kansai Paint Co., Ltd., an acrylic resin-based organic solvent-type clear coat paint containing a hydroxyl group-containing acrylic resin and a polyisocyanate compound, hereinafter, which may be referred to as the "clear coat paint (P4-2)".

Evaluation Testing

The test sheets obtained in Examples 1 to 19 and Comparative Examples 1 to 6 described above were evaluated through the following test method. The evaluation results are indicated in Table 4 below.

Test Method

Smoothness: The smoothness of each test sheet was evaluated according to the following criteria based on a Long Wave (LW) value measured using the "Wave Scan" (trade name, available from BYK-Gardner GmbH). Smaller LW values indicate higher smoothness of the coating surface.

A: LW value is less than 15.

B: LW value is from 15 to less than 18.

C: LW value is from 18 to less than 20.

D: LW value is from 20 to less than 25.

E: LW value is 25 or higher.

TABLE 6

[Table 4]

| | | | Examples | | | | | | | | |
|---|---|---|---|---|---|---|---|---|---|---|---|
| | | | 1 | 2 | 3 | 4 | 5 | 6 | 7 | 8 | 9 |
| Step (1) | Electrodeposition paint | | "Elecron GT-10" | | | | | | | | |
| Step (2) | First colored paint (P1) | Paint name | P1-1 | P1-1 | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 | 20 | 20 |
| Step (3) | Water-based second paint (P2) | Paint name | P2-1 | P2-2 | P2-3 | P2-4 | P2-5 | P2-6 | P2-7 | P2-8 | P2-9 |
| | | Paint solid content concentration ($NV_{P2}$) [mass %] | 23 | 25 | 25 | 27 | 23 | 25 | 27 | 25 | 25 |
| | | Paint viscosity ($V1_{P2}$) | 135 | 70 | 21 | 58 | 2.1 | 1.9 | 2.1 | 48 | 40 |
| | | Viscosity ($V2_{P2}$) one minute after application | 230 | 246 | 73 | 205 | 3.5 | 3.4 | 10.1 | 182 | 154 |
| | | (Viscosity ($V2_{P2}$) one minute after application)/(paint viscosity ($V1_{P2}$)) | 1.7/1 | 3.5/1 | 3.5/1 | 3.5/1 | 1.7/1 | 1.8/1 | 4.8/1 | 3.8/1 | 3.9/1 |
| | Cured film thickness ($T_{P2}$) [μm] | | 12 | 12 | 12 | 12 | 12 | 12 | 12 | 12 | 12 |
| Step (4) | Water-based third colored paint (P3) | Paint name | P3-1 | P3-1 | P3-1 | P3-1 | P3-1 | P3-1 | P3-1 | P3-2 | P3-2 |
| | | Paint solid content concentration ($NV_{P3}$) [mass %] | 12 | 12 | 12 | 12 | 12 | 12 | 12 | 14 | 14 |
| | Cured film thickness ($T_{P3}$) [μm] | | 4 | 4 | 4 | 4 | 4 | 4 | 4 | 4 | 4 |
| Step (5) | Clear coat paint (P4) | Paint name | P4-1 | P4-1 | P4-1 | P4-1 | P4-1 | P4-1 | P4-1 | P4-1 | P4-1 |
| | Cured film thickness [μm] | | 35 | 35 | 35 | 35 | 35 | 35 | 35 | 35 | 35 |
| Step (6) | Heating temperature [° C.] | | 140 | 140 | 140 | 140 | 140 | 140 | 140 | 140 | 140 |
| | Heating time [min] | | 30 | 30 | 30 | 30 | 30 | 30 | 30 | 30 | 30 |
| Paint solid content concentration ratio $NV_{P2}/NV_{P3}$ | | | 1.9/1 | 2.1/1 | 2.1/1 | 2.3/1 | 1.9/1 | 2.1/1 | 2.3/1 | 1.8/1 | 1.8/1 |
| Cured film thickness ratio $T_{P2}/T_{P3}$ | | | 3/1 | 3/1 | 3/1 | 3/1 | 3/1 | 3/1 | 3/1 | 3/1 | 3/1 |
| Evaluation | Smoothness | | A | B | C | C | B | B | C | A | B |

TABLE 7

Table 4 (Continuation-1)

| | | | Examples | | | | | | | |
|---|---|---|---|---|---|---|---|---|---|---|
| | | | 10 | 11 | 12 | 13 | 14 | 15 | 16 | 17 |
| Step (1) | Electrodeposition paint | | "Elecron GT-10" | | | | | | | |
| Step (2) | First colored paint (P1) | Paint name | P1-1 | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 | 25 |
| Step (3) | Water-based second paint (P2) | Paint name | P2-10 | P2-11 | P2-12 | P2-13 | P2-14 | P2-15 | P2-16 | P2-8 |
| | | Paint solid content concentration ($NV_{P2}$) [mass %] | 25 | 25 | 21 | 27 | 25 | 25 | 25 | 25 |
| | | Paint viscosity ($V1_{P2}$) | 39 | 55 | 82 | 45 | 22 | 60 | 59 | 48 |
| | | Viscosity ($V2_{P2}$) one minute after application | 142 | 195 | 254 | 156 | 100 | 196 | 195 | 182 |
| | | (Viscosity ($V2_{P2}$) one minute after application)/(paint viscosity ($V1_{P2}$)) | 3.6/1 | 3.5/1 | 3.1/1 | 3.5/1 | 4.5/1 | 3.3/1 | 3.8/1 | 3.8/1 |
| | Cured film thickness ($T_{P2}$) [μm] | | 12 | 12 | 12 | 12 | 12 | 12 | 12 | 12 |
| Step (4) | Water-based third colored paint (P3) | Paint name | P3-2 | P3-2 | P3-2 | P3-2 | P3-2 | P3-2 | P3-2 | P3-2 |
| | | Paint solid content concentration ($NV_{P3}$) [mass %] | 14 | 14 | 14 | 14 | 14 | 14 | 14 | 14 |
| | Cured film thickness ($T_{P3}$) [μm] | | 4 | 4 | 4 | 4 | 4 | 4 | 4 | 4 |

TABLE 7-continued

Table 4 (Continuation-1)

| | | | Examples | | | | | | | |
|---|---|---|---|---|---|---|---|---|---|---|
| | | | 10 | 11 | 12 | 13 | 14 | 15 | 16 | 17 |
| Step (5) | Clear coat paint (P4) | Paint name | P4-1 | P4-1 | P4-1 | P4-1 | P4-1 | P4-1 | P4-1 | P4-1 |
| | Cured film thickness [μm] | | 35 | 35 | 35 | 35 | 35 | 35 | 35 | 35 |
| Step (6) | Heating temperature [° C.] | | 140 | 140 | 140 | 140 | 140 | 140 | 140 | 140 |
| | Heating time [min] | | 30 | 30 | 30 | 30 | 30 | 30 | 30 | 30 |
| Paint solid content concentration ratio $NV_{P2}/NV_{P3}$ | | | 1.8/1 | 1.8/1 | 1.5/1 | 1.9/1 | 1.8/1 | 1.8/1 | 1.8/1 | 1.8/1 |
| Cured film thickness ratio $T_{P2}/T_{P3}$ | | | 3/1 | 3/1 | 3/1 | 3/1 | 3/1 | 3/1 | 3/1 | 3/1 |
| Evaluation | Smoothness | | C | B | B | B | C | B | B | B |

TABLE 8

Table 4 (Continuation-2)

| | | | Examples | | Comparative Example | | | | | |
|---|---|---|---|---|---|---|---|---|---|---|
| | | | 18 | 19 | 1 | 2 | 3 | 4 | 5 | 6 |
| Step (1) | Electrodeposition paint | | "Elecron GT-10" | | "Elecron GT-10" | | | | | |
| Step (2) | First colored paint (P1) | Paint name | P1-1 | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 | 20 |
| Step (3) | Water-based second paint (P2) | Paint name | P2-8 | P2-8 | P2-17 | P2-18 | P2-19 | P2-20 | P2-21 | P2-22 |
| | | Paint solid content concentration ($NV_{P2}$) [mass %] | 25 | 25 | 23 | 25 | 27 | 25 | 25 | 25 |
| | | Paint viscosity ($V1_{P2}$) | 48 | 48 | 18 | 14 | 14 | 153 | 1.9 | 55 |
| | | Viscosity ($V2_{P2}$) one minute after application | 182 | 182 | 122 | 140 | 147 | 748 | 2.0 | 280 |
| | | (Viscosity ($V2_{P2}$) one minute after application)/(paint viscosity ($V1_{P2}$)) | 3.8/1 | 3.8/1 | 6.7/1 | 9.7/1 | 10.5/1 | 4.9/1 | 1.1/1 | 5.1/1 |
| | Cured film thickness ($T_{P2}$) [μm] | | 12 | 12 | 12 | 12 | 12 | 12 | 12 | 12 |
| Step (4) | Water-based third colored paint (P3) | Paint name | P3-3 | P3-2 | P3-1 | P3-1 | P3-1 | P3-1 | P3-1 | P3-2 |
| | | Paint solid content concentration ($NV_{P3}$) [mass %] | 12 | 14 | 12 | 12 | 12 | 12 | 12 | 14 |
| | Cured film thickness ($T_{P3}$) [μm] | | 4 | 4 | 4 | 4 | 4 | 4 | 4 | 4 |
| Step (5) | Clear coat paint (P4) | Paint name | P4-1 | P4-2 | P4-1 | P4-1 | P4-1 | P4-1 | P4-1 | P4-1 |
| | Cured film thickness [μm] | | 35 | 35 | 35 | 35 | 35 | 35 | 35 | 35 |
| Step (6) | Heating temperature [° C.] | | 140 | 140 | 140 | 140 | 140 | 140 | 140 | 140 |
| | Heating time [min] | | 30 | 30 | 30 | 30 | 30 | 30 | 30 | 30 |
| Paint solid content concentration ratio $NV_{P2}/NV_{P3}$ | | | 2.1/1 | 1.8/1 | 1.9/1 | 2.1/1 | 2.3/1 | 2.1/1 | 2.1/1 | 1.8/1 |
| Cured film thickness ratio $T_{P2}/T_{P3}$ | | | 3/1 | 3/1 | 3/1 | 3/1 | 3/1 | 3/1 | 3/1 | 3/1 |
| Evaluation | Smoothness | | B | A | D | D | D | E | E | E |

Production Example 44: Production of Bright Pigment Dispersion

In a stirring and mixing vessel, 34.3 parts (26.4 parts in terms of solid content) of "Aluminum Paste GX-3108" (trade name, available from Asahi Kasei Metals Corporation, an aluminum pigment paste, aluminum content of 77%), 15.1 parts (10.6 parts in terms of solid content) of "Alpaste 6360NS" (trade name, available from Toyo Aluminum K.K., an aluminum pigment paste, aluminum content of 70%), 35 parts of 2-ethyl-1-hexanol, 22.2 parts (11.1 parts in terms of solid content) of the solution of the acrylic resin (AC-4) having a hydroxyl group and a phosphate group and obtained in Production Example 9, and 0.2 parts of 2-(dimethylamino) ethanol were homogeneously mixed, and a bright pigment dispersion (X-11) was obtained.

Production Example 45: Production of Third Water-Based Colored Paint (P3)

A stirring and mixing vessel was charged with 100 parts (30 parts in terms of solid content) of the water-dispersible hydroxyl group-containing acrylic resin aqueous dispersion (AC-2) obtained in Production Example 7, 10.2 parts (5.6 parts in terms of solid content) of the hydroxyl group-containing acrylic resin solution (AC-1) obtained in Production Example 2, 28.6 parts (20 parts in terms of solid content) of the hydroxyl group-containing polyester resin solution (PE-2) obtained in Production Example 10, 106.8 parts of the bright pigment dispersion (X-11) obtained in Production Example 44, 37.5 parts (30 parts in terms of solid content) of "Cymel 325" (trade name, available from Allnex GmbH, melamine resin, solid content of 80%), and 28.9 parts (3.3 parts of yellow iron oxide pigment, 3.3 parts of solid content of the hydroxyl group-containing acrylic resin (AC-1)) of the yellow pigment dispersion (X-5) obtained in Production Example 14. The contents were homogeneously mixed, after which 3.1 parts (1.0 parts in terms of solid content) of "Adeka NOL UH-756VF" (trade name, available from Adeka Corporation, urethane associative thickener, solid content of 32%), 3.6 parts (1.0 part in terms of solid content) of "Primal ASE-60" (trade name, available from The Dow Chemical Company, polyacrylic acid-based thickener, solid content of 28%), 2-(dimethylamino) ethanol and deionized water were further added, and a third water-based colored paint (P3-4) having a pH of 8.0 and a paint solid content concentration (NVP3) of 14% was obtained.

Production Example 46

A third water-based colored paint (P3-5) having a pH of 8.0 was obtained in the same manner as Production Example 45 with the exception that the formulation composition and paint solid content concentration (NVP3) of Production Example 45 were changed as indicated in Table 5 below.

TABLE 9

Table 5

| | | Production Example | |
|---|---|---|---|
| | | 45 | 46 |
| Name of third water-based colored paint (P3) | | P3-4 | P3-5 |
| Binder component ($A_{P3}$) | Water-dispersible hydroxyl group-containing acrylic resin (AC-2) aqueous dispersion | 100.0 | 100.0 |
| | Hydroxyl group-containing acrylic resin (AC-1) solution | 10.2 | 10.2 |
| | Hydroxyl group-containing polyester resin (PE-2) solution | 28.6 | 28.6 |
| | "Cymel 325" | 37.5 | 37.5 |
| Bright pigment dispersion (X-11) | | 106.8 | 106.8 |
| Yellow pigment dispersion (X-5) | | 28.9 | 28.9 |
| Thickener | "Adeka NOL UH-756 VF" (Note 1) | 3.1 | 4.7 |
| | "Primal ASE-60" (Note 2) | 3.6 | 5.4 |
| Paint solid content concentration ($NV_{P3}$) [mass %] | | 14 | 12 |
| Content proportion [parts by mass] of bright pigment ($B_{P3}$) based on 100 parts by mass of solid content of binder component ($A_{P3}$) | | 37 | 37 |
| Content proportion [mass %] of bright pigment ($B_{P3}$) based on paint solid content in third water-based colored paint (P3) | | 26 | 26 |

Preparation of Test Sheet

Respective test sheets were prepared in the following manner using the first colored paint (P1-1) obtained in Production Example 6, the second water-based paints (P2-8) to (P2-22) obtained in Production Examples 24 to 38, the third water-based colored paints (P3-4) and (P3-5) obtained in Production Examples 45 and 46, and the above-mentioned clear coat paint, and evaluation tests were conducted.

Examples 20 to 31 and Comparative Example 7

Test sheets were produced in the same manner as in Example 1 with the exception that the type and cured film thickness of the first water-based colored paint, the second water-based paint, the third water-based colored paint, and the clear coat paint used in Example 1 were changed as indicated in Table 6 below, and the smoothness was evaluated by the test method described above. The evaluation results are indicated in Table 6 below.

TABLE 10

Table 6

| | | | Examples | | | | | | |
|---|---|---|---|---|---|---|---|---|---|
| | | | 20 | 21 | 22 | 23 | 24 | 25 | 26 |
| Step (1) | Electrodeposition paint | | "Elecron GT-10" | | | | | | |
| Step (2) | First colored paint (P1) | Paint name | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 |

TABLE 10-continued

Table 6

| | | | Examples 20 | 21 | 22 | 23 | 24 | 25 | 26 |
|---|---|---|---|---|---|---|---|---|---|
| Step (3) | Water-based second paint (P2) | Paint name | P2-8 | P2-9 | P2-10 | P2-11 | P2-12 | P2-13 | P2-14 |
| | | Paint solid content concentration ($NV_{P2}$) [mass %] | 25 | 25 | 25 | 25 | 21 | 27 | 25 |
| | | Paint viscosity ($V1_{P2}$) | 48 | 40 | 39 | 55 | 82 | 45 | 22 |
| | | Viscosity ($V2_{P2}$) one minute after application | 182 | 154 | 142 | 195 | 254 | 156 | 100 |
| | | (Viscosity ($V2_{P2}$) one minute after application)/(paint viscosity ($V1_{P2}$)) | 3.8/1 | 3.9/1 | 3.6/1 | 3.5/1 | 3.1/1 | 3.5/1 | 4.5/1 |
| | Cured film thickness ($T_{P2}$) [μm] | | 12 | 12 | 12 | 12 | 12 | 12 | 12 |
| Step (4) | Water-based third colored paint (P3) | Paint name | P3-4 | P3-4 | P3-4 | P3-4 | P3-4 | P3-4 | P3-4 |
| | | Paint solid content concentration ($NV_{P3}$) [mass %] | 14 | 14 | 14 | 14 | 14 | 14 | 14 |
| | Cured film thickness ($T_{P3}$) [μm] | | 4 | 4 | 4 | 4 | 4 | 4 | 4 |
| Step (5) | Clear coat paint (P4) | Paint name | P4-1 | P4-1 | P4-1 | P4-1 | P4-1 | P4-1 | P4-1 |
| | Cured film thickness [μm] | | 35 | 35 | 35 | 35 | 35 | 35 | 35 |
| Step (6) | Heating temperature [° C.] | | 140 | 140 | 140 | 140 | 140 | 140 | 140 |
| | Heating time [min] | | 30 | 30 | 30 | 30 | 30 | 30 | 30 |
| Paint solid content concentration ratio $NV_{P2}/NV_{P3}$ | | | 1.8/1 | 1.8/1 | 1.8/1 | 1.8/1 | 1.5/1 | 1.9/1 | 1.8/1 |
| Cured film thickness ratio $T_{P2}/T_{P3}$ | | | 3/1 | 3/1 | 3/1 | 3/1 | 3/1 | 3/1 | 3/1 |
| Evaluation | Smoothness | | A | B | C | B | B | B | C |

TABLE 11

Table 6 (Continuation-1)

| | | | Examples 27 | 28 | 29 | 30 | 31 | Comparative Example 7 |
|---|---|---|---|---|---|---|---|---|
| Step (1) | Electrodeposition paint | | "Elecron GT-10" | | | | | |
| Step (2) | First colored paint (P1) | Paint name | P1-1 | P1-1 | P1-1 | P1-1 | P1-1 | P1-1 |
| | Cured film thickness ($T_{P1}$) [μm] | | 20 | 20 | 25 | 20 | 20 | 20 |
| Step (3) | Water-based second paint (P2) | Paint name | P2-15 | P2-16 | P2-8 | P2-8 | P2-8 | P2-22 |
| | | Paint solid content concentration ($NV_{P2}$) [mass %] | 25 | 25 | 25 | 25 | 25 | 25 |
| | | Paint viscosity ($V1_{P2}$) | 60 | 59 | 48 | 48 | 48 | 55 |
| | | Viscosity ($V2_{P2}$) one minute after application | 196 | 195 | 182 | 182 | 182 | 280 |
| | | (Viscosity ($V2_{P2}$) one minute after application)/(paint viscosity ($V1_{P2}$)) | 3.3/1 | 3.8/1 | 3.8/1 | 3.8/1 | 3.8/1 | 5.1/1 |
| | Cured film thickness ($T_{P2}$) [μm] | | 12 | 12 | 12 | 12 | 12 | 12 |
| Step (4) | Water-based third colored paint (P3) | Paint name | P3-4 | P3-4 | P3-4 | P3-5 | P3-4 | P3-4 |
| | | Paint solid content concentration ($NV_{P3}$) [mass %] | 14 | 14 | 14 | 12 | 14 | 14 |
| | Cured film thickness ($T_{P3}$) [μm] | | 4 | 4 | 4 | 4 | 4 | 4 |
| Step (5) | Clear coat paint (P4) | Paint name | P4-1 | P4-1 | P4-1 | P4-1 | P4-2 | P4-1 |
| | Cured film thickness [μm] | | 35 | 35 | 35 | 35 | 35 | 35 |
| Step (6) | Heating temperature [° C.] | | 140 | 140 | 140 | 140 | 140 | 140 |
| | Heating time [min] | | 30 | 30 | 30 | 30 | 30 | 30 |
| Paint solid content concentration ratio $NV_{P2}/NV_{P3}$ | | | 1.8/1 | 1.8/1 | 1.8/1 | 2.1/1 | 1.8/1 | 1.8/1 |
| Cured film thickness ratio $T_{P2}/T_{P3}$ | | | 3/1 | 3/1 | 3/1 | 3/1 | 3/1 | 3/1 |
| Evaluation | Smoothness | | B | B | B | B | A | E |

Production Example 47: Production of Black Pigment Dispersion 25 parts (14 parts in terms of resin solid content) of the hydroxyl group-containing acrylic resin solution (AC-1) obtained in Production Example 2, 7 parts of "Raven 5000 Ultra III Beads" (trade name, available from Birla Carbon, carbon black pigment), and 68 parts of deionized water were mixed, the pH was adjusted to 7.5 using 2-(dimethylamino) ethanol, after which the mixture was dispersed with a paint shaker for 30 minutes, and a black pigment dispersion (X-10) was obtained.

Production Example 48: Production of Second Water-Based Paint (P2)

A stirring and mixing vessel was charged with 100 parts (30 parts in terms of solid content) of the water-dispersible hydroxyl group-containing acrylic resin aqueous dispersion (AC-2) obtained in Production Example 7, 18.7 parts (10.3 parts in terms of solid content) of the hydroxyl group-containing acrylic resin solution (AC-1) obtained in Production Example 2, 21.4 parts (15 parts in terms of solid content) of the hydroxyl group-containing polyester resin solution (PE-2) obtained in Production Example 10, 28.6 parts (10 parts in terms of solid content) of "Ucoat UX-8100" (trade name, available from Sanyo Chemical Industries, Ltd., urethane resin emulsion, solid content of 35%), 40.6 parts (32.5 parts in terms of solid content) of "Cymel 325" (trade name, available from Allnex GmbH, melamine resin, solid content of 80%), 35.0 parts of 2-ethyl-1-hexanol, 16.0 parts (5 parts of barium sulfate pigment, 2 parts of solid content of the hydroxyl group-containing acrylic resin (AC-1)) of the extender pigment dispersion (X-3) obtained in Production Example 5, and 1.44 parts (0.1 parts of carbon black pigment, 0.2 parts of solid content of the hydroxyl group-containing acrylic resin (AC-1)) of the black pigment dispersion (X-10) obtained in Production Example 47. The contents were homogeneously mixed, after which 10.0 parts (2.0 parts in terms of solid content) of the acrylic associative thickener diluted solution obtained in Production Example 12, 2-(dimethylamino) ethanol and deionized water were further added, and a second water-based paint (P2-23) having a pH of 8.0 and a paint solid content of 23% was obtained.

The viscosity (V1P2) of the obtained second water-based paint (P2-23) measured under conditions including a shear rate of 0.1 sec-1 and a temperature of 23° C. was 27 Pa sec. The viscosity (V1P2) was measured using, as a viscoelasticity measuring device, the HAAKE RheoStress RS150 (trade name, available from HAAKE) and was the viscosity (V1P2) measured at a shear rate of 0.1 sec-1 when the shear rate was varied from 10000 sec-1 to 0.0001 sec-1 at a temperature of 23° C.

Additionally, the viscosity (V2P2) of the second water-based coating (P2-23) one minute after application was 33 Pa·sec. The viscosity (V2P2) one minute after application was obtained as follows. The second water-based paint (P2-23) was applied onto a tin plate having a length of 45 cm, a width of 30 cm, and a thickness of 0.8 mm using the "ABB Cartridge Bell Coater" (trade name, available from ABB Ltd.), which is a rotary atomizing-type bell coater, under conditions including a bell diameter of 77 mm, a bell rotational speed of 25000 rpm, a shaping air flow rate of 700 NL/min, an applied voltage of −60 kV, a temperature of 23° C. and a humidity of 75%, so that the dried film thickness was 12 μm. Next, one minute after the second water-based paint (P2-23) was applied onto the tin plate, a portion of the coating film was scraped off and sampled using a spatula. The viscoelasticity measuring device "HAAKE RheoStress RS150" (trade name, available from HAAKE) was then used to measure the viscosity at a shear rate of 0.1 sec-1 when the shear rate was varied from 10000 sec-1 to 0.0001 sec-1 at a temperature of 23° C. The obtained viscosity was used as the viscosity (V2P2).

Further, a ratio (V2P2)/(V1P2) of the viscosity (V2P2) of the second water-based paint (P2-23) one minute after application to the viscosity (V1P2) was 1.2/1.

Production Examples 49 to 55

Second water-based paints (P2-24) to (P2-30) having a pH of 8.0 were obtained in the same manner as Production Example 48 with the exception that the formulation composition and paint solid content of Production Example 48 were changed as indicated in Table 7 below. The viscosity (V1P2) of the obtained second water-based paint, the viscosity (V2P2) one minute after application, and the ratio (V2P2)/(V1P2) of the viscosity (V2P2) one minute after application to the viscosity (V1P2) are also indicated in Table 7 below.

TABLE 12

Table 7

| | Production Example | | | | | | | |
|---|---|---|---|---|---|---|---|---|
| | 48 | 49 | 50 | 51 | 52 | 53 | 54 | 55 |
| Name of second water-based paint (P2) | P2-23 | P2-24 | P2-25 | P2-26 | P2-27 | P2-28 | P2-29 | P2-30 |
| Water-dispersible hydroxyl group-containing acrylic resin (AC-2) aqueous dispersion | 100 | 100 | 100 | 100 | 100 | 150 | 150 | 100 |
| Hydroxyl group-containing acrylic resin (AC-1) solution | 18.7 | 18.7 | 18.7 | 19.1 | 18.7 | 18.7 | 18.7 | 18.7 |
| Hydroxyl group-containing polyester resin (PE-2) solution | 21.4 | 21.4 | 21.4 | 21.4 | 21.4 | | | 21.4 |
| "Ucoat UX-8100" | 28.6 | 28.6 | 28.6 | 28.6 | 28.6 | 28.6 | 28.6 | 28.6 |
| "Cymel 325" | 40.6 | 40.6 | 40.6 | 40.6 | 40.6 | 40.6 | 40.6 | 40.6 |
| 2-ethyl-1-hexanol | 35.0 | 35.0 | 35.0 | 35.0 | 35.0 | 35.0 | 35.0 | 35.0 |

TABLE 12-continued

Table 7

| | | Production Example | | | | | | | |
|---|---|---|---|---|---|---|---|---|---|
| | | 48 | 49 | 50 | 51 | 52 | 53 | 54 | 55 |
| Extender pigment dispersion (X-3) | | 16.0 | 16.0 | 16.0 | 16.0 | 16.0 | 16.0 | 16.0 | 16.0 |
| Black pigment dispersion (X-10) | | 1.44 | 1.44 | 1.44 | | 1.44 | 1.44 | 1.44 | 1.44 |
| Thickener | Acrylic associative thickener diluted solution (RC-1) | 10.0 | 9.0 | 8.0 | 9.0 | | 9.5 | | |
| | "Adeka NOL UH-756 VF" (Note 1) | | | | | 6.3 | | 6.6 | |
| | "Primal ASE-60" (Note 2) | | | | | | | | 8.9 |
| Paint solid content concentration ($NV_{P2}$) [mass %] | | 23 | 25 | 27 | 25 | 25 | 25 | 25 | 25 |
| Paint viscosity ($V1_{P2}$) | | 27 | 17 | 21 | 17 | 3.1 | 27 | 2.4 | 25 |
| Viscosity ($V2_{P2}$) of second water-based colored paint (P2) one minute after application | | 33 | 24 | 28 | 24 | 14 | 43 | 7.4 | 178 |
| (Viscosity ($V2_{P2}$) one minute after application)/(paint viscosity ($V1_{P2}$)) | | 1.2/1 | 1.4/1 | 1.4/1 | 1.4/1 | 4.3/1 | 1.6/1 | 3.1/1 | 7.0/1 |

Production Example 56: Production of Bright Pigment Dispersion

In a stirring and mixing vessel, 20.0 parts (14.0 parts in terms of solid content) of "Alpaste 6360NS" (trade name, available from Toyo Aluminum K.K., an aluminum pigment paste, aluminum content of 70%), 18.9 parts (14.0 in terms of solid content) of "Aluminum Paste GX-180A" (trade name, available from Asahi Kasei Metals Corporation, an aluminum pigment paste, aluminum content of 74%), 35 parts of 2-ethyl-1-hexanol, 16.8 parts (8.4 parts in terms of solid content) of the solution of the acrylic resin (AC-4) having a hydroxyl group and a phosphate group and obtained in Production Example 9, and 0.2 parts of 2-(dimethylamino) ethanol were homogeneously mixed, and a bright pigment dispersion (X-12) was obtained.

Production Example 57: Production of Third Water-Based Colored Paint (P3)

A stirring and mixing vessel was charged with 91.7 parts (27.5 parts in terms of solid content) of the water-dispersible hydroxyl group-containing acrylic resin aqueous dispersion (AC-2) obtained in Production Example 7, 9.3 parts (5.1 parts in terms of solid content) of the hydroxyl group-containing acrylic resin solution (AC-1) obtained in Production Example 2, 21.4 parts (15 parts in terms of solid content) of the hydroxyl group-containing polyester resin solution (PE-2) obtained in Production Example 10, 90.9 parts of the bright pigment dispersion (X-12) obtained in Production Example 56, 43.8 parts (35 parts in terms of solid content) of "Cymel 325" (trade name, available from Allnex GmbH, melamine resin, solid content of 80%), and 64.6 parts (4.5 parts of carbon black pigment, 9.0 parts of solid content of the hydroxyl group-containing acrylic resin (AC-1)) of the black pigment dispersion (X-10) obtained in Production Example 47. The contents were homogeneously mixed, after which 6.3 parts (2.0 parts in terms of solid content) of "Adeka NOL UH-756VF" (trade name, available from Adeka Corporation, urethane associative thickener, solid content of 32%), 7.1 parts (2.0 part in terms of solid content) of "Primal ASE-60" (trade name, available from The Dow Chemical Company, polyacrylic acid-based thickener, solid content of 28%), 2-(dimethylamino) ethanol and deionized water were further added, and a third water-based colored paint (P3-6) having a pH of 8.0 and a paint solid content concentration (NVP3) of 14% was obtained.

Production Examples 58 to 61

Third water-based colored paints (P3-7) to (P3-10) having a pH of 8.0 were obtained in the same manner as Production Example 57 with the exception that the formulation composition and paint solid content concentration (NVP3) of Production Example 57 were changed as indicated in Table 8 below.

TABLE 13

Table 8

| | | Production Example | | | | |
|---|---|---|---|---|---|---|
| | | 57 | 58 | 59 | 60 | 61 |
| Name of third water-based colored paint (P3) | | P3-6 | P3-7 | P3-8 | P3-9 | P3-10 |
| Binder component ($A_{P3}$) | Water-dispersible hydroxyl group-containing acrylic resin (AC-2) aqueous dispersion | 91.7 | 91.7 | 91.7 | 91.7 | 91.7 |
| | Hydroxyl group-containing acrylic resin (AC-1) solution | 9.3 | 9.3 | 9.3 | 9.3 | 9.3 |
| | Hydroxyl group-containing polyester resin (PE-2) solution | 21.4 | 21.4 | 21.4 | 21.4 | 21.4 |
| | "Cymel 325" | 43.8 | 43.8 | 43.8 | 43.8 | 43.8 |
| Bright pigment dispersion (X-12) | | 90.9 | 90.9 | 90.9 | 90.9 | 90.9 |
| Black pigment dispersion (X-10) | | 64.6 | 64.6 | 64.6 | 64.6 | 64.6 |
| Thickener | "Adeka NOL UH-756 VF" (Note 1) | 6.3 | 8.8 | 7.8 | 3.1 | 1.6 |
| | "Primal ASE-60" (Note 2) | 7.1 | 10.0 | 8.9 | 3.6 | 1.8 |

TABLE 13-continued

Table 8

| | Production Example | | | | |
|---|---|---|---|---|---|
| | 57 | 58 | 59 | 60 | 61 |
| Paint solid content concentration ($NV_{P3}$) [mass %] | 14 | 7 | 9 | 16 | 18 |
| Content proportion [parts by mass] of bright pigment ($B_{P3}$) based on 100 parts by mass of solid content of binder component ($A_{P3}$) | 28 | 28 | 28 | 28 | 28 |
| Content proportion [mass %] of bright pigment ($B_{P3}$) based on paint solid content in third water-based colored paint (P3) | 21 | 20 | 20 | 21 | 21 |

Preparation of Test Sheet

Examples 32 to 45 and Comparative Examples 8 and 9

Test sheets were produced in the same manner as in Example 1 with the exception that the type and cured film thickness of the first colored paint, the second water-based paint, the third water-based colored paint, and the clear coat paint used in Example 1 were changed as indicated in Table 9 below.

Evaluation Testing

The test sheets obtained in Examples 32 to 45 and Comparative Examples 8 and 9 described above were evaluated through the following test method. The evaluation results are indicated in Table 9 below.

Test Method

Smoothness: The smoothness of each test sheet was evaluated according to the following criteria based on a Long Wave (LW) value measured using the "Wave Scan" (trade name, available from BYK-Gardner GmbH). Smaller LW values indicate higher smoothness of the coating surface, and evaluations of A, B and C were considered to be passing.

A: LW value is less than 15.

B: LW value is from 15 to less than 18.

C: LW value is from 18 to less than 20.

D: LW value is from 20 to less than 25.

E: LW value is 25 or higher.

Brightness: The brightness of each test sheet was evaluated according to the following criteria based on a flip-flop value calculated by the following equation from a lightness L* (15°) and a lightness L* (110°) measured using the "MA-68II" (trade name, available from X-Rite Incorporated). Larger flip-flop values indicate a higher brightness of the coating surface. Also, evaluations of A, B, and C were considered to be passing.

Flip-flop value=(Lightness L*(15°)value)/(Lightness L*(110°)value)

Here, the lightness L* (15°) value described above indicates a lightness L* in the L*a*b* color system, measured with regard to light received at an angle of 15° in the direction of measurement light from the specular reflection angle when the measurement light is irradiated from an angle of 45° in relation to an axis perpendicular to a surface to be measured, and is measured using the multi-angle spectrophotometer "MA-68II" (available from X-Rite Incorporated).

Furthermore, the lightness L* (110°) value described above indicates a lightness L* in the L*a*b* color system, measured with regard to light received at an angle of 110° in the direction of measurement light from the specular reflection angle when the measurement light is irradiated from an angle of 45° in relation to an axis perpendicular to a surface to be measured, and is measured using the multi-angle spectrophotometer "MA-68II" (available from X-Rite Incorporated).

A: Flip-flop value of 14 or higher.

B: Flip-flop value from 13 to less than 14.

C: Flip-flop value from 12 to less than 13.

D: Flip-flop value from 11 to less than 12.

E: Flip-flop value of less than 11.

Metallic unevenness: Each test sheet was observed by the naked eye, and the degree of occurrence of metallic unevenness was evaluated based on the following criteria. Evaluations of A and B were considered to be passing.

A: Almost no metallic unevenness is observed, and extremely excellent coating film appearance is present.

B: Slight metallic unevenness is observed, and excellent coating film appearance is present.

C: Metallic unevenness is observed, and coating film appearance is slightly inferior.

D: Significant metallic unevenness is observed, and coating film appearance is inferior.

TABLE 14

Table 9

| | | | Examples | | | | | | | |
|---|---|---|---|---|---|---|---|---|---|---|
| | | | 32 | 33 | 34 | 35 | 36 | 37 | 38 | 39 |
| Step (1) | Electrodeposition paint | | "Elecron GT-10" | | | | | | | |
| Step (2) | First colored paint (P1) | Paint name | P1-1 | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 | 20 |
| Step (3) | Water-based second paint (P2) | Paint name | P2-23 | P2-24 | P2-25 | P2-26 | P2-27 | P2-28 | P2-29 | P2-24 |
| | | Paint solid content concentration ($NV_{P2}$) [mass%] | 23 | 25 | 27 | 25 | 25 | 25 | 25 | 25 |

TABLE 14-continued

Table 9

| | | | Examples 32 | 33 | 34 | 35 | 36 | 37 | 38 | 39 |
|---|---|---|---|---|---|---|---|---|---|---|
| | | Paint viscosity ($V1_{P2}$) | 27 | 17 | 21 | 17 | 3.1 | 27 | 2.4 | 17 |
| | | Viscosity ($V2_{P2}$) one minute after application | 33 | 24 | 28 | 24 | 14 | 43 | 7.4 | 24 |
| | | (Viscosity ($V2_{P2}$) one minute after application)/(paint viscosity ($V1_{P2}$)) | 1.2/1 | 1.4/1 | 1.4/1 | 1.4/1 | 4.3/1 | 1.6/1 | 3.1/1 | 1.4/1 |
| | Cured film thickness ($T_{P2}$) [μm] | | 12 | 12 | 12 | 12 | 12 | 12 | 12 | 7 |
| Step (4) | Water-based third colored paint (P3) | Paint name | P3-6 | P3-6 | P3-6 | P3-6 | P3-6 | P3-6 | P3-6 | P3-6 |
| | | Paint solid content concentration ($NV_{P3}$) [mass %] | 14 | 14 | 14 | 14 | 14 | 14 | 14 | 14 |
| | Cured film thickness ($T_{P3}$) [μm] | | 4 | 4 | 4 | 4 | 4 | 4 | 4 | 4 |
| Step (5) | Clear coat paint (P4) | Paint name | P4-1 | P4-1 | P4-1 | P4-1 | P4-1 | P4-1 | P4-1 | P4-1 |
| | Cured film thickness [μm] | | 35 | 35 | 35 | 35 | 35 | 35 | 35 | 35 |
| Step (6) | Heating temperature [° C.] | | 140 | 140 | 140 | 140 | 140 | 140 | 140 | 140 |
| | Heating time [min] | | 30 | 30 | 30 | 30 | 30 | 30 | 30 | 30 |
| Paint solid content concentration ratio $NV_{P2}/NV_{P3}$ | | | 1.6/1 | 1.8/1 | 1.9/1 | 1.8/1 | 1.8/1 | 1.8/1 | 1.8/1 | 1.8/1 |
| Cured film thickness ratio $T_{P2}/T_{P3}$ | | | 3/1 | 3/1 | 3/1 | 3/1 | 3/1 | 3/1 | 3/1 | 1.8/1 |
| Evaluation | Smoothness | | B | B | B | B | B | C | C | B |
| | Brightness | | A | A | B | B | B | B | C | A |
| | Metallic unevenness | | A | A | A | A | A | A | A | A |

TABLE 15

Table 9 (Continuation-1)

| | | | Examples | | | | | | Comparative Example | |
|---|---|---|---|---|---|---|---|---|---|---|
| | | | 40 | 41 | 42 | 43 | 44 | 45 | 8 | 9 |
| Step (1) | Electrodeposition paint | | "Elecron GT-10" | | | | | | "Elecron GT-10" | |
| Step (2) | First colored paint (P1) | Paint name | P1-1 | P1-1 | P1-1 | P1-1 | P1-1 | P1-1 | P1-1 | P1-1 |
| | Cured film thickness ($T_{P1}$) [μm] | | 20 | 20 | 20 | 20 | 20 | 20 | 20 | 20 |
| Step (3) | Water-based second paint (P2) | Paint name | P2-24 | P2-24 | P2-24 | P2-24 | P2-24 | P2-24 | P2-30 | P2-24 |
| | | Paint solid content concentration ($NV_{P2}$) [mass %] | 25 | 25 | 25 | 25 | 25 | 25 | 25 | 25 |
| | | Paint viscosity ($V1_{P2}$) | 17 | 17 | 17 | 17 | 17 | 17 | 25 | 17 |
| | | Viscosity ($V2_{P2}$) one minute after application | 24 | 24 | 24 | 24 | 24 | 24 | 178 | 24 |
| | | (Viscosity ($V2_{P2}$) one minute after application)/(paint viscosity ($V1_{P2}$)) | 1.4/1 | 1.4/1 | 1.4/1 | 1.4/1 | 1.4/1 | 1.4/1 | 7.0/1 | 1.4/1 |
| | Cured film thickness ($T_{P2}$) [μm] | | 10 | 14 | 17 | 12 | 12 | 12 | 12 | 12 |
| Step (4) | Water-based third colored paint (P3) | Paint name | P3-6 | P3-6 | P3-6 | P3-7 | P3-8 | P3-9 | P3-6 | P3-10 |
| | | Paint solid content concentration ($NV_{P3}$) [mass %] | 14 | 14 | 14 | 7 | 9 | 16 | 14 | 18 |
| | Cured film thickness ($T_{P3}$) [μm] | | 4 | 4 | 4 | 4 | 4 | 4 | 4 | 4 |
| Step (5) | Clear coat paint (P4) | Paint name | P4-1 | P4-1 | P4-1 | P4-1 | P4-1 | P4-1 | P4-1 | P4-1 |
| | Cured film thickness [μm] | | 35 | 35 | 35 | 35 | 35 | 35 | 35 | 35 |
| Step (6) | Heating temperature [° C.] | | 140 | 140 | 140 | 140 | 140 | 140 | 140 | 140 |
| | Heating time [min] | | 30 | 30 | 30 | 30 | 30 | 30 | 30 | 30 |
| Paint solid content concentration ratio $NV_{P2}/NV_{P3}$ | | | 1.8/1 | 1.8/1 | 1.8/1 | 3.6/1 | 2.8/1 | 1.6/1 | 1.8/1 | 1.4/1 |
| Cured film thickness ratio $T_{P2}/T_{P3}$ | | | 2.5/1 | 3.5/1 | 4.3/1 | 3/1 | 3/1 | 3/1 | 3/1 | 3/1 |
| Evaluation | Smoothness | | B | C | C | A | A | B | D | A |
| | Brightness | | A | B | B | A | A | C | A | D |
| | Metallic unevenness | | A | A | A | B | A | A | A | A |

Production Example 62: Production of Bright Pigment Dispersion

In a stirring and mixing vessel, 12 parts (solid content of 1.2 parts) of "Hydroshine WS-3001" (trade name, vapor-deposited aluminum flake pigment for water-based use, available from Eckart GmbH, solid content: 10%, internal solvent: isopropanol, average particle diameter D50:13 μm, thickness: 0.05 μm, silica-treated surface), 0.79 parts (solid content of 0.37 parts) of "Alpaste EMR-B6360" (trade name, available from Toyo Aluminum K.K., solid content: 47%, non-leafing aluminum flakes, average particle diameter D50: 10.3 μm, thickness: 0.19 μm, silica-treated surface), 8.3 parts of isopropanol, and 8.3 parts of deionized water were stirred and mixed, and a bright pigment dispersion was obtained.

Production Example 63: Production of Third Water-Based Colored Paint (P3)

In a stirring and mixing vessel, 40.0 parts deionized water, 25.0 parts (0.5 parts in terms of solid content) of "Aurovisco" (trade name, thickener, available from Oji Paper Co., Ltd., phosphate esterified cellulose nanofibers, solid content: 2%), 0.25 parts of "Dynol 604" (trade name, acetylene diol-based wetting agent, available from Evonik Industries AG, solid content of 100%), 29.39 parts of the bright pigment dispersion obtained in Production Example 62, 0.48 parts (0.033 parts of carbon black pigment, 0.067 parts of solid content of hydroxyl group-containing acrylic resin (AC-1)) of the black pigment dispersion (X-10) obtained in Production Example 47, 0.35 parts (0.14 parts in terms of solid content) of "TINUVIN 479-DW" (trade name, UV absorber, available from BASF SE, hydroxyphenyl triazine-based UV absorber, containing the HPT-based UV absorber TINUVIN 479 in an acrylic polymer, solid content: 40%), 0.22 parts (0.11 parts in terms of solid content) of "TINUVIN 123-DW" (trade name, light stabilizer, available from BASF SE, bis(2,2,6,6-tetramethyl-1-(octyloxy)-4-piperidinyl) decanedioate, containing HALS TINUVIN 123 having an aminoether group in an acrylic polymer, solid content: 50%), 2.22 parts (0.67 parts in terms of solid content) of the water-dispersible hydroxyl group-containing acrylic resin aqueous dispersion (AC-2) obtained in Production Example 7, 0.50 parts of 2-ethyl-1-hexanol and 5.0 parts of deionized water were stirred and mixed, and a third water-based colored paint (P3-11) having a paint solid content concentration (NVP3) of 3.2% was adjusted.

Production Examples 64 to 67

Third water-based colored paints (P3-12) to (P3-15) were obtained in the same manner as Production Example 63 with the exception that the formulation composition and paint solid content concentration (NVP3) of Production Example 63 were changed as indicated in Table 10 below.

TABLE 16

Table 10

| Production Example | | | | 63 | 64 | 65 | 66 | 67 |
|---|---|---|---|---|---|---|---|---|
| Name of third water-based paint (P3) | | | | P3-11 | P3-12 | P3-13 | P3-14 | P3-15 |
| Deionized water | | | | 40.0 | 40.0 | 40.0 | 40.0 | 40.0 |
| Thickener | | | "Aurovisco" | 25.0 | 25.0 | 25.0 | 25.0 | 25.0 |
| Wetting agent | | | "Dynol 604" | 0.25 | 0.25 | 0.25 | 0.25 | 0.25 |
| Bright pigment dispersion | Bright pigment ($B_{P3}$) | Vapor-deposited aluminum flake pigment | "Hydroshine WS3001" | 12.0 | 15.7 | | 12.0 | 12.0 |
| | | Aluminum flake pigment | "Alpaste EMR-B6360" | 0.79 | | 5.32 | 0.79 | 0.79 |
| | Organic solvent | | Isopropanol | 8.3 | 8.3 | 8.3 | 8.3 | 8.3 |
| | Deionized water | | | 8.3 | 8.3 | 8.3 | 8.3 | 8.3 |
| Black pigment dispersion (X-10) | | | | 0.48 | 0.48 | 0.48 | 0.48 | 0.48 |
| UV absorber | | | "Tinuvin 479-DW" | 0.35 | 0.35 | 0.35 | 0.35 | 0.35 |
| Light stabilizer | | | "Tinuvin 123-DW" | 0.22 | 0.22 | 0.22 | 0.22 | 0.22 |
| Binder component ($A_{P3}$) | | | Water-dispersible hydroxyl group-containing acrylic resin (AC-2) | 2.22 | 2.22 | 2.22 | 2.22 | 2.22 |
| Organic solvent | | | 2-ethyl-1-hexanol | 0.50 | 0.50 | 0.50 | 0.50 | 0.50 |
| Deionized water | | | | 5.0 | | 8.3 | 25.0 | 133.3 |
| Paint solid content concentration ($NV_{P3}$) [mass %] | | | | 3.2 | 3.3 | 4.3 | 2.7 | 1.4 |
| Content proportion [parts by mass] of bright pigment ($B_{P3}$) based on 100 parts by mass of solid content of binder component ($A_{P3}$) | | | | 214 | 214 | 341 | 214 | 214 |
| Content proportion [mass %] of bright pigment ($B_{P3}$) based on paint solid content in third water-based colored paint (P3) | | | | 47 | 47 | 59 | 47 | 47 |

Preparation of Test Sheet

Example 46

The water-based first colored paint (P1-1) obtained in Production Example 6 was electrostatically applied onto the object to be coated for testing using a rotary atomizing-type electrostatic coater such that the film thickness when cured was 20 μm, the obtained product was then left standing for 3 minutes, and then preheated at 80° C. for 3 minutes. Next, the second water-based paint (P2-24) obtained in Production Example 49 was electrostatically applied onto the uncured first colored coating film using the rotary atomizing-type electrostatic coater such that the film thickness when cured was 10 μm, and the obtained product was left standing for one minute. Next, the third water-based colored paint (P3-11) obtained in Production Example 63 was electrostatically applied onto the uncured second coating film using the rotary atomizing-type electrostatic coater such that the film thickness when cured was 2 μm, and the obtained product was left standing for 2 minutes and then preheated at 80° C. for 3 minutes. Next, "KINO-6510T" (trade name, available from Kansai Paint Co., Ltd., an acrylic resin-based organic solvent-type clear coat paint containing a hydroxyl group-containing acrylic resin and a polyisocyanate compound, hereinafter, which may be referred to as a "clear coat paint (P4-2)") was electrostatically applied onto the uncured third colored coating film such that the film thickness when cured was 35 μm, the obtained product was left standing for 7 minutes and then preheated at 140° C. for 30 minutes to thereby simultaneously cure the first colored coating film, the second coating film, the third colored coating film, and the clear coating film, and a test sheet was thereby prepared.

In the present example, the film thickness of the cured coating film of the third colored coating film was calculated from the following equation. The same applies to the following examples 47 to 49 and Comparative Example 10.

x=sc/sg/S*10000 x: Film thickness [μm]

sc: Solid content [g] coated by application sg: Specific gravity of coating film [g/cm3]

S: Evaluated surface area [cm2] of the solid content coated by application

Examples 47-49 and Comparative Example 10

Test sheet were produced in the same manner as in Example 46 with the exception that the type and cured film thickness of the third water-based colored paint in Example 46 were changed as indicated in Table 11 below.

Of these, in Comparative Example 10, dripping occurred when the third water-based colored paint (P 3-15) was applied, and therefore the following evaluation was not conducted.

Evaluation Testing

The test sheets obtained in Examples 46 to 49 described above were evaluated through the following test method. The evaluation results are indicated in Table 11 below.

Test Method

Smoothness: The smoothness of each test sheet was evaluated according to the following criteria based on a Long Wave (LW) value measured using the "Wave Scan" (trade name, available from BYK-Gardner GmbH). Smaller LW values indicate higher smoothness of the coating surface, and evaluations of A, B and C were considered to be passing.

A: LW value is less than 15.

B: LW value is from 15 to less than 18.

C: LW value is from 18 to less than 20.

D: LW value is from 20 to less than 25.

E: LW value is 25 or higher.

Metallic unevenness: Each test sheet was observed by the naked eye, and the degree of occurrence of metallic unevenness was evaluated based on the following criteria. Evaluations of A and B were considered to be passing.

A: Almost no metallic unevenness is observed, and extremely excellent coating film appearance is present.

B: Slight metallic unevenness is observed, and excellent coating film appearance is present.

C: Metallic unevenness is observed, and coating film appearance is slightly inferior.

D: Significant metallic unevenness is observed, and coating film appearance is inferior.

TABLE 17

Table 11

| | | | Examples 46 | 47 | 48 | 49 | Comparative Example 10 |
|---|---|---|---|---|---|---|---|
| Step (1) | Electrodeposition paint | | "Elecron GT-10" | | | | "Elecron GT-10" |
| Step (2) | First colored paint (P1) | Paint name | P1-1 | P1-1 | P1-1 | P1-1 | P1-1 |
| | Cured film thickness ($T_{P1}$) [μm] | | 20 | 20 | 20 | 20 | 20 |
| Step (3) | Water-based second paint (P2) | Paint name | P2-24 | P2-24 | P2-24 | P2-24 | P2-24 |
| | | Paint solid content concentration ($NV_{P2}$) [mass %] | 25 | 25 | 25 | 25 | 25 |
| | | Paint viscosity ($V1_{P2}$) | 17 | 17 | 17 | 17 | 17 |
| | | Viscosity ($V2_{P2}$) one minute after application | 24 | 24 | 24 | 24 | 24 |
| | | (Viscosity ($V2_{P2}$) one minute after application)/(paint viscosity ($V1_{P2}$)) | 1.4/1 | 1.4/1 | 1.4/1 | 1.4/1 | 1.4/1 |
| | Cured film thickness ($T_{P2}$) [μm] | | 10 | 10 | 10 | 10 | 10 |

TABLE 17-continued

Table 11

| | | | Examples | | | | Comparative Example |
|---|---|---|---|---|---|---|---|
| | | | 46 | 47 | 48 | 49 | 10 |
| Step (4) | Water-based third paint (P3) | Paint name | P3-11 | P3-12 | P3-13 | P3-14 | P3-15 |
| | | Paint solid content concentration ($NV_{P3}$) [mass %] | 3.2 | 3.3 | 4.3 | 2.7 | 1.4 |
| | Cured film thickness ($T_{P3}$) [μm] | | 2 | 2 | 2 | 2 | Not evaluable due to dripping |
| Step (5) | Clear coat paint (P4) | Paint name | P4-2 | P4-2 | P4-2 | P4-2 | P4-2 |
| | Cured film thickness [μm] | | 35 | 35 | 35 | 35 | 35 |
| Step (6) | Heating temperature [° C.] | | 140 | 140 | 140 | 140 | 140 |
| | Heating time [min] | | 30 | 30 | 30 | 30 | 30 |
| Paint solid content concentration ratio $NV_{P2}/NV_{P3}$ | | | 7.8/1 | 7.6/1 | 5.8/1 | 9.3/1 | 17.9/1 |
| Cured film thickness ratio $T_{P2}/T_{P3}$ | | | 5/1 | 5/1 | 5/1 | 5/1 | Incalcuable |
| Evaluation | Smoothness | | A | A | A | A | Not evaluable due to dripping |
| | Metallic unevenness | | A | A | A | B | Not evaluated |

The invention claimed is:

1. A method of forming a multi-layer coating film, the method comprising steps (1) to (6):

(1) applying an electrodeposition paint onto a steel sheet, heating and curing an applied electrodeposition paint to form a cured electrodeposited coating film;

(2) applying a first colored paint (P1) onto the cured electrodeposited coating film obtained in step (1) to form a first colored coating film;

(3) applying a second water-based paint (P2) onto the first colored coating film obtained in step (2) to form a second coating film having a cured film thickness ($T_{P2}$) in a range of from 5 to 20 μm;

(4) applying a third water-based colored paint (P3) onto the second coating film obtained in step (3) to form a third colored coating film having a cured film thickness ($T_{P3}$) in a range of from 0.5 to 7 μm, the third water-based colored paint (P3) comprising a binder component ($A_{P3}$) and a bright pigment ($B_{P3}$), and a paint solid content concentration ($NV_{P3}$) being in a range of from 2 to 17 mass %;

(5) applying a clear coat paint (P4) onto the third colored coating film obtained in step (4) to form a clear coating film; and (6) heating a multi-layer coating film comprising the first colored coating film, the second coating film, the third colored coating film, and the clear coating film formed in steps (2) to (5) to simultaneously curing the multi-layer coating film, wherein a viscosity ($V2_{P2}$) of the second water-based paint (P2) one minute after application is in a range of from 3 to 500 Pa·sec when measured under conditions including a shear rate of 0.1 $sec^{-1}$ and a temperature of 23° C., and a ratio $(V2_{P2})/(V1_{P2})$ of the viscosity ($V2_{P2}$) one minute after application to a viscosity ($V1_{P2}$) of the second water-based paint (P2) measured under conditions including a shear rate of 0.1 $sec^{-1}$ and a temperature of 23° C. is in a range of from 1.1/1 to 5/1.

2. The method of forming a multi-layer coating film according to claim 1, wherein the first colored paint (P1) is a water-based paint.

3. The method of forming a multi-layer coating film according to claim 1, wherein a cured film thickness ($T_{P1}$) of the first colored coating film is in a range of from 15 to 40 μm.

4. The method of forming a multi-layer coating film according to claim 1, wherein the viscosity ($V1_{P2}$) of the second water-based paint (P2) measured under conditions including a shear rate of 0.1 $sec^{-1}$ and a temperature of 23° C. is in a range of from 20 to 300 Pa·sec.

5. The method of forming a multi-layer coating film according to claim 1, wherein a content proportion of the binder component ($A_{P3}$) and the bright pigment ($B_{P3}$) in the third water-based colored paint (P3) is such that based on 100 parts by mass of solid content of the binder component ($A_{P3}$), a content of the bright pigment ($B_{P3}$) is in a range of from 3 to 500 parts by mass.

6. The method of forming a multi-layer coating film according to claim 1, wherein a content proportion of the bright pigment ($B_{P3}$) in the third water-based colored paint (P3) is in a range of from 3 to 80 mass % based on a paint solid content in the third water-based colored paint (P3).

* * * * *